(12) United States Patent
Mizuhashi et al.

(10) Patent No.: US 9,798,403 B2
(45) Date of Patent: Oct. 24, 2017

(54) DISPLAY DEVICE

(71) Applicant: Japan Display Inc., Minato-ku (JP)

(72) Inventors: Hiroshi Mizuhashi, Minato-ku (JP);
Toshiaki Fukushima, Minato-ku (JP);
Gen Koide, Minato-ku (JP); Yoshiyuki Kii, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 329 days.

(21) Appl. No.: 14/709,945

(22) Filed: May 12, 2015

(65) Prior Publication Data

US 2015/0356911 A1     Dec. 10, 2015

(30) Foreign Application Priority Data

Jun. 5, 2014 (JP) ................. 2014-116882

(51) Int. Cl.
*G06F 3/041* (2006.01)
*G02F 1/1333* (2006.01)
*G06F 3/044* (2006.01)

(52) U.S. Cl.
CPC ........ *G06F 3/0412* (2013.01); *G02F 1/13338* (2013.01); *G06F 3/044* (2013.01)

(58) Field of Classification Search
None
See application file for complete search history.

(56) References Cited

U.S. PATENT DOCUMENTS

| 2011/0267293 A1 | 11/2011 | Noguchi et al. |
| 2012/0050659 A1 | 3/2012 | Nakanishi et al. |
| 2012/0262387 A1 | 10/2012 | Mizuhashi et al. |
| 2014/0152616 A1 | 6/2014 | Kida et al. |
| 2015/0355764 A1 | 12/2015 | Mizuhashi et al. |

FOREIGN PATENT DOCUMENTS

| JP | 2011-233018 | 11/2011 |
| JP | 2012-047807 | 3/2012 |
| JP | 2012-230657 | 11/2012 |
| JP | 2014-132446 | 7/2014 |

OTHER PUBLICATIONS

Office Action dated Jun. 30, 2017 in Chinese Patent Application No. 201510268808.2 (with English translation).

*Primary Examiner* — Gustavo Polo
(74) *Attorney, Agent, or Firm* — Oblon, McClelland, Maier & Neustadt, L.L.P.

(57) ABSTRACT

According to one embodiment, a display device includes first and second substrate units, a display function layer, and a drive element. The first substrate unit includes a first substrate, a display unit, and a control circuit unit. The first substrate has a first surface including a display region and a peripheral region. The display unit is provided in the display region, and includes first lines, second lines, switch elements, pixel electrodes, and third lines. The control circuit unit is provided in the peripheral region, and includes a first circuit unit including a third line connection line, and a third line switch. The second substrate unit includes a second substrate and fourth lines. The display function layer is provided between the first and second substrate units. The drive element is provided on the peripheral region. The first circuit unit is partially disposed between the drive element and the first substrate.

15 Claims, 11 Drawing Sheets

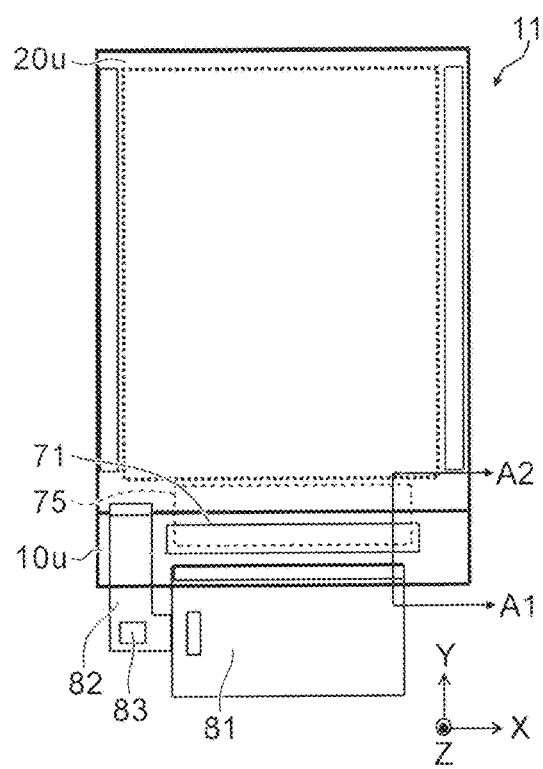
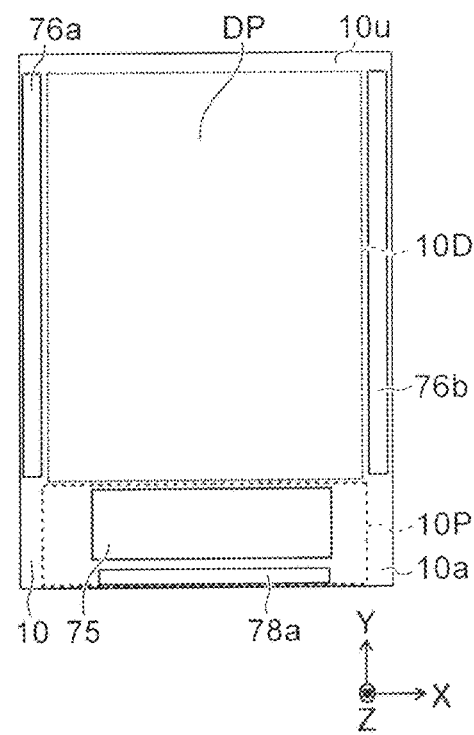
FIG. 1A　　　　　FIG. 1B
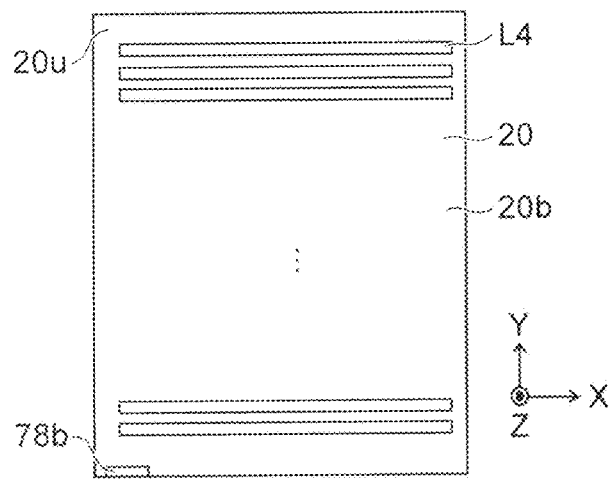
FIG. 1C

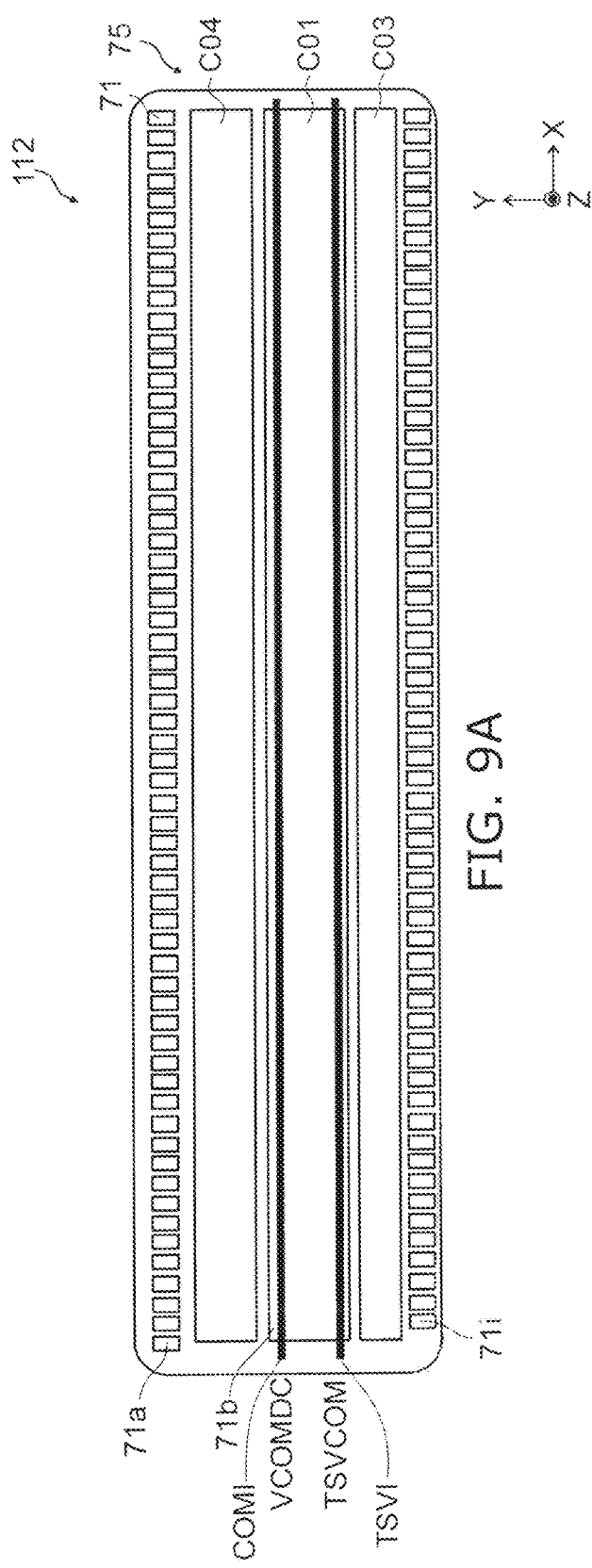
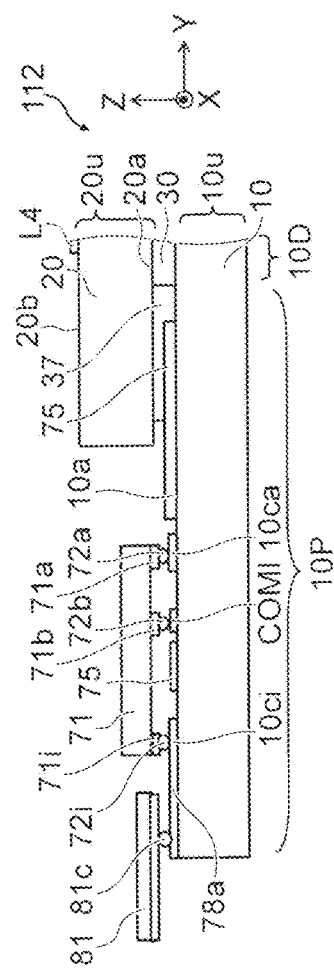
FIG. 9A
FIG. 9B

DISPLAY DEVICE

CROSS-REFERENCE TO RELATED APPLICATIONS

This application is based upon and claims the benefit of priority from Japanese Patent Application No. 2014-116882, filed on Jun. 5, 2014; the entire contents of which are incorporated herein by reference.

FIELD

Embodiments described herein relate generally to a display device.

BACKGROUND

A display device that uses a liquid crystal, organic EL, etc., has been developed. Other than a display operation, for example, there are cases where a sense operation of a touch input is performed in the display device. A compact device is desirable for such a display device.

SUMMARY OF THE INVENTION

According to one embodiment, a display device includes a first substrate unit, a second substrate unit, a display function layer, and a drive element. The first substrate unit includes a first substrate, a display unit, and a control circuit unit. The first substrate has a first surface including a display region and a peripheral region. The display unit is provided in the display region. The display unit includes a plurality of first lines extending in a first direction and being arranged in a second direction intersecting the first direction, the first direction intersecting a direction from the peripheral region toward the display region, a plurality of second lines extending in the second direction and being arranged in the first direction, a plurality of switch elements, each of the plurality of switch elements being electrically connected to one of the plurality of first lines and one of the plurality of second lines, a plurality of pixel electrodes electrically connected respectively to the plurality of switch elements, and a plurality of third lines extending in the second direction and being arranged in the first direction. The control circuit unit is provided in the peripheral region. The control circuit unit includes a first circuit unit. The first circuit unit includes a third line connection line electrically connected to at least one of the plurality of third lines, and a third line switch electrically connected to the third line connection line. The second substrate unit includes a second substrate and a plurality of fourth lines. The second substrate has a second surface and a third surface. The second surface opposes the first surface. The third surface is on a side opposite to the second surface. The plurality of fourth lines is provided at the third surface, extends in a third direction, and is arranged in a fourth direction. The third direction is parallel to the third surface and intersects the second direction. The fourth direction is parallel to the third surface and intersects the third direction. The display function layer is provided between the first substrate unit and the second substrate unit, and performs an optical operation based on an electrical signal applied to the plurality of pixel electrodes. The drive element is provided on the peripheral region, and is capable of outputting the electrical signal. At least a portion of the first circuit unit is disposed between the drive element and the first substrate.

BRIEF DESCRIPTION OF THE DRAWINGS

FIG. 1A to FIG. 1C are schematic plan views illustrating a display device according to a first embodiment;

FIG. 9A and FIG. 9B are schematic views illustrating another display device according to the first embodiment;

DETAILED DESCRIPTION

Figure 2:
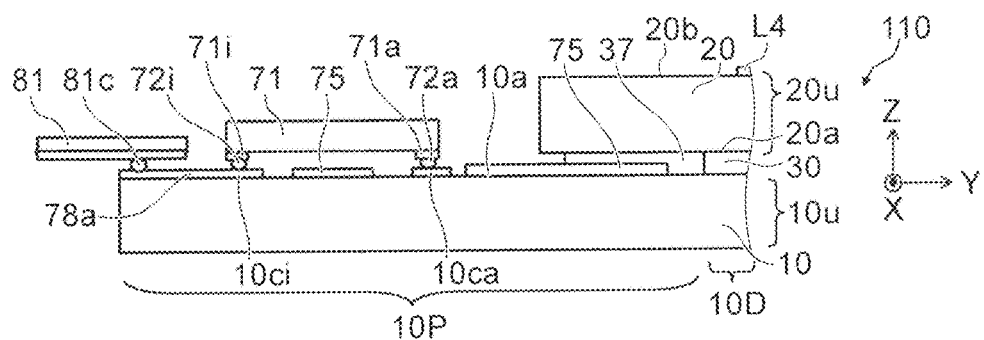
FIG. 2 is a schematic cross-sectional view illustrating the display device according to the first embodiment.

Embodiments of the invention will now be described with reference to the drawings.

The disclosure is but an example; and appropriate modifications within the spirit of the invention will be readily apparent to one skilled in the art and naturally are within the scope of the invention. Moreover, although the widths, thicknesses, configurations, etc., of components in the drawings may be illustrated schematically compared to the actual embodiments for better clarification of description, these are merely examples and do not limit the construction of the invention.

Further, in the specification and the drawings, components similar to those described in regard to a drawing thereinabove are marked with like reference numerals, and a detailed description may be omitted as appropriate.

First Embodiment

FIG. 1A to FIG. 1C are schematic plan views illustrating a display device according to a first embodiment.

As shown in FIG. 1A, the display device 110 according to the embodiment includes a first substrate unit 10*u*, a second substrate unit 20*u*, and a drive element 71.

FIG. 1B illustrates the first substrate unit 10*u*. The first substrate unit 10*u* includes a first substrate 10, a display unit DP, and a control circuit unit 75. The first substrate 10 has a first surface 10*a*. A display region 10D and a peripheral region 10P are provided on the first surface 10*a* side of the first substrate 10. The display unit DP is provided on the display region 10D. The control circuit unit 75 is provided on the peripheral region 10P.

As described below, various lines, switch elements, and pixel electrodes are provided in the display unit DP. An example of the display unit DP is described below.

For example, one direction intersecting a direction from the peripheral region 10P toward the display region 10D is taken as a first direction. The first direction is parallel to the first surface 10a. The direction described above from the peripheral region 10P toward the display region 10D is taken as a second direction. A direction perpendicular to the first direction and the second direction is taken as a fifth direction.

The first direction is taken as an X-axis direction. A direction parallel to the first surface 10a and perpendicular to the X-axis direction is taken as a Y-axis direction. A direction perpendicular to the X-axis direction and the Y-axis direction is taken as a Z-axis direction. As described below, the Y-axis direction corresponds to the second direction; and the Z-axis direction corresponds to the fifth direction.

A display is performed in the display region 10D. In the example shown in FIG. 1B, the first substrate unit 10u further includes a first gate driver 76a and a second gate driver 76b. The display region 10D is disposed in the region between the first gate driver 76a and the second gate driver 76b. For example, the first gate driver 76a is separated from the second gate driver 76b in the first direction.

The first substrate unit 10u further includes a first substrate connector unit 78a. The first substrate connector unit 78a is provided in the peripheral region 10P of the first substrate 10. For example, the first substrate connector unit 78a is electrically connected to at least one of the control circuit unit 75 or the gate drivers.

In the embodiment, the state of being electrically connected includes the state in which two conductors are in direct contact, and the state in which a current flows between two conductors that have another conductor inserted therebetween. Further, the state of being electrically connected includes the state in which it is possible to form a state in which a current flow between two conductors that have an element (e.g., a switch element or the like) inserted therebetween.

FIG. 1C illustrates the second substrate unit 20u. The second substrate unit 20u includes a second substrate 20 and multiple lines (fourth lines L4 described below). The second substrate 20 has a second surface 20a (referring to FIG. 2) and a third surface 20b. The second surface 20a is the surface that opposes the first surface 10a. The third surface 20b is the surface on the side opposite to the second surface 20a. The fourth lines L4 are provided in the third surface 20b. As described below, for example, the fourth lines L4 are used to sense a touch input. A second substrate connector unit 78b is provided in the second substrate 20. The second substrate connector unit 78b is electrically connected to the fourth lines L4. In the example shown in FIG. 1A, the display device 110 further includes a first circuit substrate 81, a second circuit substrate 82, and a sensor 83 (e.g., a touch sensing IC). The first circuit substrate 81 is electrically connected to the first substrate connector unit 78a. The second circuit substrate 82 is electrically connected to the second substrate connector unit 78b. In the example shown in FIG. 1A, the sensor 83 is mounted on the second circuit substrate 82. For example, FPCs (Flexible Printed Circuits) are used as these circuit substrates. The sensor 83 and the drive element 71 can operate synchronously with each other.

As shown in FIG. 1A, the drive element 71 is provided on the peripheral region 10P of the first substrate 10. For example, the drive element 71 and the second substrate unit 20u do not overlap in the plane, even when the first surface 10a and the second substrate unit 20u overlap in the plane.

FIG. 2 is a schematic cross-sectional view illustrating the display device according to the first embodiment.

FIG. 2 illustrates a line A1-A2 cross section of FIG. 1A.

As shown in FIG. 2, the drive element 71 is provided on the peripheral region 10P of the first substrate 10. At least a portion of the control circuit unit 75 is disposed between the drive element 71 and the first substrate 10. In other words, the drive element 71 is disposed on at least a portion of the control circuit unit 75.

Thereby, the surface area of the peripheral region 10P can be small compared to the case where the control circuit unit 75 and the drive element 71 do not overlap each other. Thereby, the device can be compact.

For example, the drive element 71 includes a first output electrode 71a and an input electrode 71i. The first output electrode 71a and the input electrode 71i are provided on the surface of the drive element 71 on the first substrate 10 side. For example, the first output electrode 71a outputs an electrical signal for displaying the image to the drive element 71.

On the other hand, the first substrate unit 10u includes a connection electrode 10ca and an input connection electrode 10ci. The connection electrode 10ca and the input connection electrode 10ci are provided in the peripheral region 10P.

The display device 110 further includes a first connection member 72a and an input connection member 72i. The first connection member 72a is disposed between the first output electrode 71a and the connection electrode 10ca and electrically connects the first output electrode 71a and the connection electrode 10ca. The input connection member 72i is disposed between the input electrode 71i and the input connection electrode 10ci and electrically connects the input electrode 71i and the input connection electrode 10ci.

For example, a glass substrate may be used as the first substrate 10. For example, the drive element 71 is mounted on the first substrate 10 by a COG (Chip on Glass) method.

In the example shown in FIG. 2, the first substrate connector unit 78a and the first circuit substrate 81 are connected by a connecting conductive member 81c.

As illustrated in FIG. 2, a display function layer 30 is disposed between the first substrate unit 10u and the second substrate unit 20u. In the example, a sealing unit 37 is provided between the first substrate unit 10u and the second substrate unit 20u. For example, the sealing unit 37 bonds the first substrate 10 and the second substrate 20. In the example, a portion of the control circuit unit 75 contacts the sealing unit 37. Thereby, the surface area of the regions (e.g., the peripheral region 10P) other than the display region 10D can be reduced.

Figure 3:
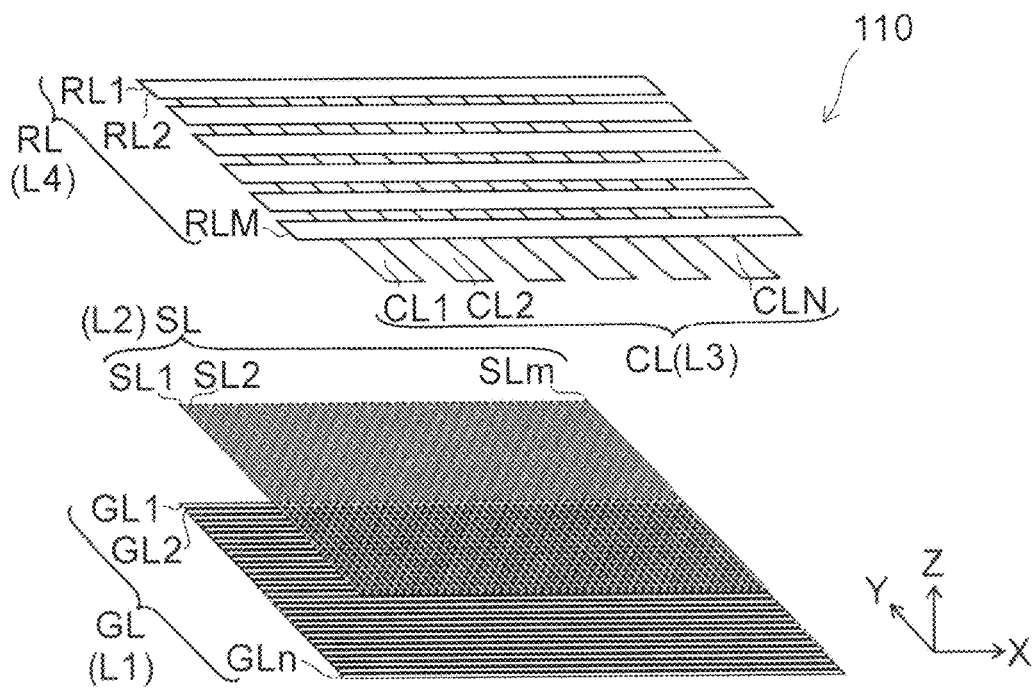
FIG. 3 is a schematic perspective view illustrating the display device according to the first embodiment.

An example of the various lines, switch elements, and pixel electrodes provided in the display unit DP will now be described. FIG. 3 is a schematic perspective view illustrating the display device according to the first embodiment.

As shown in FIG. 3, the display device 110 according to the embodiment includes multiple first lines L1 (e.g., gate lines GL), multiple second lines L2 (e.g., signal lines SL), and multiple third lines L3 (e.g., common lines CL). The first lines L1, the second lines L2, and the third lines L3 are included in the display unit DP. The multiple fourth lines L4 also are illustrated in FIG. 3.

Each of the multiple first lines L1 extends in the first direction. As described above, the first direction is the direction intersecting the direction from the peripheral region 10P toward the display region 10D. The multiple first lines L1 are arranged in the second direction. The second direction intersects the first direction. In the example, the second direction is perpendicular to the first direction. The first direction is parallel to the X-axis direction; and the second direction is parallel to the Y-axis direction.

Each of the multiple second lines L2 extends in the second direction. The multiple second lines L2 are arranged in the first direction.

Each of the multiple third lines L3 extends in the second direction. The multiple third lines L3 are arranged in the first direction.

The multiple fourth lines L4 are separated from the first to third lines L1 to L3 in a direction (the Z-axis direction, i.e., the fifth direction) perpendicular to the X-Y plane. Each of the multiple fourth lines L4 extends in a third direction. The third direction is parallel to the X-Y plane (e.g., parallel to the third surface 20b). The third direction intersects the second direction. The multiple fourth lines L4 are arranged in the fourth direction. The fourth direction is parallel to the X-Y plane and intersects the third direction. In the example, the third direction is parallel to the X-axis direction; and the fourth direction is parallel to the Y-axis direction.

As described above, for example, the multiple first lines L1 are the gate lines GL. The multiple gate lines GL include, for example, a first gate line GL1, a second gate line GL2, and an nth gate line GLn. The number of gate lines GL is n. n is an integer not less than 2. For example, n is 2560. In the embodiment, n is arbitrary.

As described above, for example, the multiple second lines L2 are the signal lines SL. The multiple signal lines SL include, for example, a first signal line SL1, a second signal line SL2, and an mth signal line SLm. The number of signal lines SL is m. m is an integer not less than 2. For example, in the case where the set of a red pixel, a green pixel, and a blue pixel is used as one component, the number of components is 1600.

In the case where the number of components is 1600, m is 1600×3=4800. The signal lines SL are provided according to the number of multiple pixels arranged along the first direction. In the embodiment, m is arbitrary.

As described above, for example, the multiple third lines L3 are the common lines CL. The multiple common lines CL include, for example, a first common line CL1, a second common line CL2, and an Nth common line CLN. The number of common lines CL is N. N is an integer not less than 2. In the embodiment, N is arbitrary.

As described above, for example, the multiple fourth lines L4 are sense lines RL. The multiple sense lines RL include, for example, a first sense line RL1, a second sense line RL2, and an Mth sense line RLM. The number of sense lines RL is M. M is an integer not less than 2. In the embodiment, M is arbitrary.

In the example, the signal lines SL and the common lines CL are disposed between the gate lines GL and the sense lines RL. In the embodiment, various modifications are possible for the arrangement of these lines in the fifth direction. In other words, it is possible to arbitrarily change the vertical relationship between the gate lines GL, the signal lines SL, the common lines CL, and the sense lines RL.

As described below, the display is performed using the multiple gate lines GL, the multiple signal lines SL, and the multiple common lines CL. In the example, for example, an input (e.g., a touch input) is performed using the multiple common lines CL and the multiple sense lines RL. In the embodiment, the sense lines RL may be omitted in the case where the input operation is not performed.

As described below, the control circuit unit 75 recited above is electrically connected to at least one of the multiple second lines L2 (the signal lines SL) and at least one of the multiple third lines (the common lines CL).

As shown in FIG. 3, for example, the number m of signal lines SL is larger than the number N of common lines CL. By setting the number of signal lines SL to be large, a high definition display can be implemented. On the other hand, there are many cases where the resolution of the input may be lower than the resolution of the display. Therefore, the number of common lines CL can be smaller than the number of gate lines GL. By setting the number of common lines CL to be small, the time necessary for the sense operation can be shorter; and a display having no incongruity or low incongruity becomes possible.

For example, the multiple signal lines SL are divided into multiple groups. For example, the multiple signal lines SL include first to kth groups, etc. Each of the multiple groups includes multiple mutually-adjacent signal lines SL. For example, the number of signal lines SL included in one group is j. j is an integer not less than 2.

For example, each of the groups of the multiple signal lines SL and one common line CL (i.e., the multiple common lines CL respectively) overlap when projected onto the X-Y plane.

Figure 4:
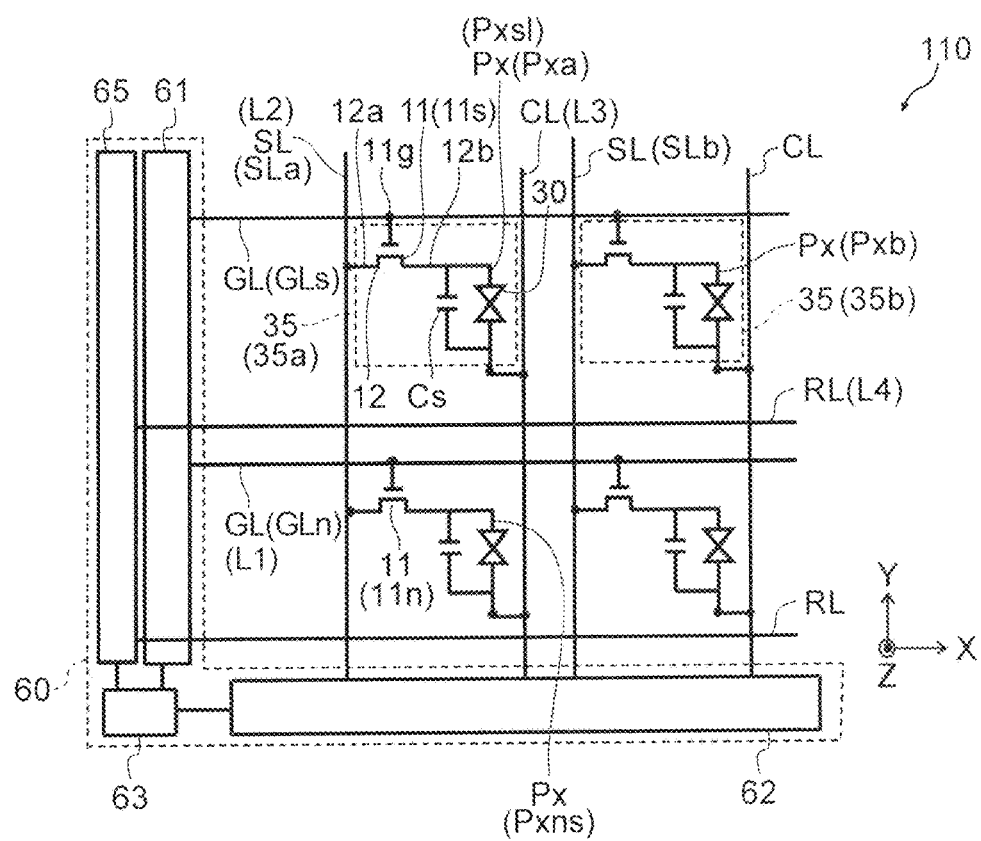
FIG. 4 is a schematic view illustrating the display device according to the first embodiment.

FIG. 4 is a schematic view illustrating the display device according to the first embodiment.

As illustrated in FIG. 4, multiple switch elements 11, multiple pixel electrodes Px, and a display function layer 30 are provided in the display device 110. The switch elements 11 and the pixel electrodes Px are included in the display unit DP. Each of the multiple switch elements 11 is electrically connected to one of the multiple first lines L1 (the gate lines GL) and one of the multiple second lines L2 (the signal lines SL).

For example, the switch element 11 includes a gate 11g and a semiconductor layer 12. The semiconductor layer 12 includes a first portion 12a and a second portion 12b. The gate 11g is electrically connected to one of the multiple gate lines GL. The first portion 12a of the semiconductor layer 12 is electrically connected to one of the multiple signal lines SL.

The multiple pixel electrodes Px are electrically connected respectively to the multiple switch elements 11. For example, one pixel electrode Px is electrically connected to the second portion 12b of the semiconductor layer 12 of the switch element 11.

The display function layer 30 performs an optical operation based on an electrical signal applied to the multiple pixel electrodes Px. The optical operation includes at least one of a light emission or a change of an optical characteristic. As described below, for example, the display function layer 30 is provided between the multiple pixel electrodes Px and the multiple sense lines RL. The drive element 71 is capable of outputting the electrical signal applied to the pixel electrodes Px to the control circuit unit 75. The electrical signal is supplied to the pixel electrodes Px via the drive element 71.

In the case where a liquid crystal layer is used as the display function layer 30, the optical operation includes a change of an optical characteristic. The optical characteristic includes, for example, at least one of birefringence, optical rotatory properties, scattering properties, light reflectance, or light absorptance. For example, the electrical signal that is applied to the pixel electrodes Px generates an electric field between the pixel electrodes Px and the common lines CL or between the pixel electrodes Px and common electrodes connected to the common lines CL. The liquid crystal alignment of the display function layer 30 (the liquid crystal layer) changes due to the electric field that is generated; and the effective birefringence changes. At least one of optical rotatory properties, scattering properties, light reflectance, or light absorptance may change. Although a liquid crystal layer is used as the display function layer 30 in the display device 110 shown in FIG. 4, a light emitting layer may be used instead of the liquid crystal layer in the display device 110.

In the case where a light emitting layer (e.g., an organic light emitting layer) is used as the display function layer 30, the optical operation includes light emission (the emission of light). In the case where organic electro luminescence is used as an example of the organic light emitting layer, electrons move from one electrode; and holes move from the other electrode. The light emission is produced by the electrons and the holes recombining in the light emitting layer. Also, it is possible to use an inorganic light emitting layer instead of the organic light emitting layer as the light emitting layer.

In other words, the display function layer 30 performs an optical operation of at least one of a light emission or a change of an optical characteristic.

In the case where, for example, a liquid crystal layer is used as the display function layer 30, the display function layer 30 is used as a load capacitance. In the example shown in FIG. 4, a storage capacitor Cs is provided in parallel with the display function layer 30. The storage capacitor Cs may be provided as necessary and may be omitted.

Multiple pixels 35 are provided in the display device 110. At least one switch element 11 and at least one pixel electrode Px are provided in each of the multiple pixels 35. In other words, the multiple switch elements 11 are provided respectively in the multiple pixels 35. The multiple pixel electrodes Px are provided respectively in the multiple pixels 35.

As illustrated in FIG. 4, a drive unit 60 is provided in the display device 110.

The drive unit 60 includes, for example, a first drive circuit 61, a second drive circuit 62, and a controller 63. The first drive circuit 61 is electrically connected to the multiple gate lines GL. The second drive circuit 62 is electrically connected to the multiple signal lines SL and the multiple common lines CL. The controller 63 is electrically connected to the first drive circuit 61 and the second drive circuit 62. The appropriate signal processing of the electrical signals acquired by the controller 63 is performed. The electrical signals for which the signal processing is performed are supplied to the first drive circuit 61 and the second drive circuit 62. The electrical signals include the image signal.

For example, the following is performed in the display operation. The image signal is supplied to the multiple second lines L2 (the signal lines SL) while setting one of the multiple first lines L1 (the gate lines GL) to a select potential.

For example, the first lines L1 include a selection gate line GLs and a non-selection gate line GLn. The selection gate line GLs is set to the select potential. The non-selection gate line GLn is set to an unselect potential that is different from the select potential.

The multiple switch elements 11 include a selection switch element 11s and a non-selection switch element 11n.

The selection switch element 11s is electrically connected to the first line L1 (the selection gate line GLs) set to the select potential. The non-selection switch element 11n is electrically connected to the first line L1 (the non-selection gate line GLn) set to the unselect potential.

The multiple pixel electrodes Px include a selection pixel electrode Pxsl and a non-selection pixel electrode Pxns. The selection pixel electrode Pxsl is electrically connected to the selection switch element 11s. The non-selection pixel electrode Pxns is electrically connected to the non-selection switch element 11n.

In the display operation, the selection pixel electrode Pxsl (the pixel electrode Px of the multiple pixel electrodes Px electrically connected to the selection switch element 11s) is set to the image potential based on the image signal via the selection switch element 11s (the switch element 11 of the multiple switch elements 11 electrically connected to the first line L1 set to the select potential).

On the other hand, at least one of the multiple third lines L3 (the common lines CL) is set to a prescribed potential (e.g., a display counter potential VCOMDC described below).

Thereby, the selection pixel electrode Pxsl is set to the desired potential. For example, the optical operation is performed in the display function layer 30 according to the electric field (the voltage) generated between the selection pixel electrode Pxsl and the common line CL; and the desired light is obtained. The desired display is obtained by sequentially selecting the multiple first lines L1.

Thus, the optical operation of the display function layer 30 (e.g., the liquid crystal layer) at the multiple pixels 35 is controlled by the gate lines GL, the signal lines SL, the switch elements 11, and the pixel electrodes Px. In the display operation, for example, the common lines CL are utilized as counter electrodes of the pixel electrodes Px. In other words, the potential of each of the multiple pixel electrodes Px is controlled by the electrical signal being supplied to the pixel electrode Px via the switch element 11. The display is performed by the alignment of the liquid crystal changing due to the electric field generated by the pixel electrodes Px and the common lines CL.

For example, the first gate driver 76a and the second gate driver 76b illustrated in FIG. 1B are included in the first drive circuit 61. For example, the drive element 71 and the control circuit unit 75 illustrated in FIG. 2 are included in the second drive circuit 62.

A sense circuit 65 may be further provided in the drive unit 60. The sense circuit 65 is electrically connected to the sense lines RL. In the sense operation, for example, the change of the capacitance that is formed between each of the multiple common lines CL and each of the multiple sense lines RL is sensed by the second drive circuit 62 and the sense circuit 65. For example, the sensor 83 illustrated in FIG. 1A is included in the sense circuit 65.

For example, the touch input to the display device 110 is sensed by the multiple sense lines RL and the multiple common lines CL. In the sense operation, for example, an input member (e.g., an input pen, etc.), a finger of a viewer (a user) of the display device 110, etc., is in contact with or proximal to the display device 110. The electrostatic capacitance that is formed by the sense lines RL and the common lines CL changes due to the contact or proximity recited above. The touch input is sensed by sensing the change of the electrostatic capacitance. For example, electrostatic-capacitance type sensing is performed. It can be said that such a display device 110 is a display device that has an input function.

In the sense operation (a second operation OP2 described below), the sensor 83 senses the current flowing between at least one of the multiple fourth lines L4 and at least one of the multiple third lines L3. For example, the sensor 83 senses the change of the current based on the change of the capacitance between the at least one of the multiple fourth lines L4 and the at least one of the multiple third lines L3 due to an object proximal to the at least one of the multiple fourth lines L4. Thereby, for example, the sensing of the touch input is performed.

In the embodiment, the common lines CL (the third lines L3) are used as counter electrodes for the sensing while being used as counter electrodes for the display.

As illustrated in FIG. 4, the multiple pixels 35 include a first color pixel 35a and a second color pixel 35b. For example, the multiple pixel electrodes Px include a first color pixel electrode Pxa for the first color and a second color pixel electrode Pxb for the second color. The second color is different from the first color. The multiple signal lines SL include a first color line SLa and a second color line SLb. The first color line SLa is electrically connected to the first color pixel electrode Pxa via one of the multiple switch elements 11. The second color line SLb is electrically connected to the second color pixel electrode Pxb via one other of the multiple switch elements 11. Further, a third color pixel and a third pixel electrode may be provided. Accordingly, a third color line may be provided. Pixels 35 having four or more colors may be provided. An example of the case where pixels 35 of three colors are provided will now be described.

Figure 5:
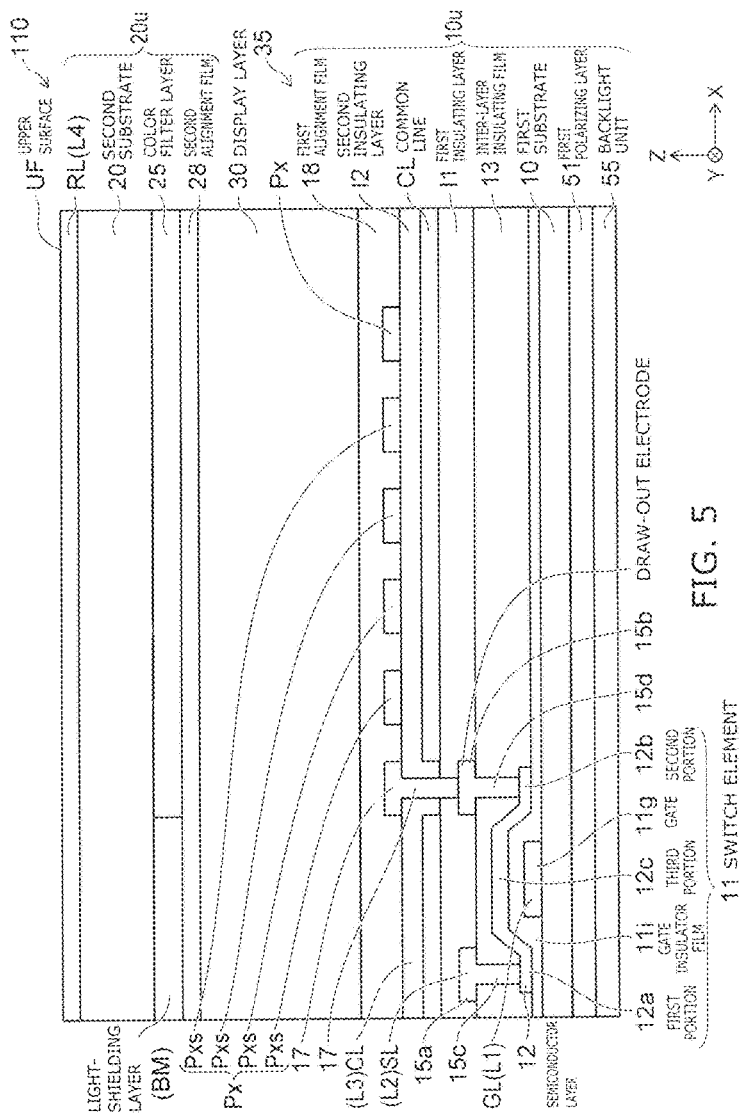
FIG. 5 is a schematic cross-sectional view illustrating the display device according to the first embodiment.

FIG. 5 is a schematic cross-sectional view illustrating the display device according to the first embodiment.

As shown in FIG. 5, the first substrate unit 10u, the second substrate unit 20u, and the display function layer 30 are provided in the display device 110. The multiple pixels 35 are provided in the display device 110. FIG. 5 illustrates a portion of one pixel 35.

For example, an array substrate is used as the first substrate unit 10u. For example, the first substrate 10, the gate lines GL (the first lines L1), the switch elements 11, the signal lines SL (the second lines L2), the common lines CL (the third lines L3), and the pixel electrodes Px are provided in the first substrate unit 10u.

For example, the gate lines GL and the signal lines SL extend in the X-Y plane. The first substrate unit 10u extends in the X-Y plane.

The first substrate 10 shown in FIG. 5 is light-transmissive. For example, glass or a resin is used as the first substrate 10. The gate lines GL are provided on the first substrate 10.

In the embodiment, a thin film transistor (TFT) is used as the switch element 11. The switch element 11 includes the semiconductor layer 12. The semiconductor layer 12 includes the first portion 12a, the second portion 12b, and a third portion 12c. The second portion 12b is separated from the first portion 12a in the X-Y plane. The third portion 12c is disposed between the first portion 12a and the second portion 12b. The first portion 12a is used as one of the source or drain of the switch element 11. The second portion 12b is used as the other of the source or drain. The third portion 12c is used as the channel portion of the switch element 11.

The switch element 11 further includes the gate 11g and a gate insulator film 11i. The gate insulator film 11i is provided between the third portion 12c and the gate 11g. In FIG. 5, the third portion 12c is disposed on the gate 11g. In the example, the switch element 11 has a bottom-gate structure. In the embodiment, the switch element 11 may have a top-gate structure.

A first metal layer is used as at least one of the gate line GL or the gate 11g. The first metal layer includes, for example, at least one of Mo (molybdenum), MoW (molybdenum-tungsten), Al (aluminum), or Cu (copper). For example, the first metal layer includes Mo. The gate line GL and the gate 11g may be formed using different materials or may be formed in the same layer using the same material. In the case where the gate line GL and the gate 11g are formed using the different materials, a connection region is provided; and the gate line GL and the gate 11g are connected electrically.

The semiconductor layer 12 includes, for example, at least one of polysilicon, amorphous silicon, or crystalline silicon. An oxide semiconductor may be used as the semiconductor layer 12. For example, the semiconductor layer 12 may include an oxide including at least one of indium (In), gallium (Ga), or zinc (Zn).

The signal line SL is electrically connected to the first portion 12a. The signal line SL shown in FIG. 5 includes a first connector 15a in the region on an inter-layer insulating layer 13, and a first connecting conductive unit 15c in the region inside the inter-layer insulating layer 13. In FIG. 5, the first connecting conductive unit 15c which is a portion of the signal line SL is electrically connected to the first portion 12a.

On the other hand, a draw-out electrode that is connected to the pixel electrode Px is provided on the second portion 12b. The draw-out electrode includes a second connector 15b in the region on the inter-layer insulating layer 13, and a second connecting conductive unit 15d in the region inside the inter-layer insulating layer 13. In FIG. 5, the second connecting conductive unit 15d is electrically connected to the second portion 12b.

A second metal layer is used as the first connector 15a and the first connecting conductive unit 15c which are portions of the signal line SL and as the second connector 15b and the second connecting conductive unit 15d which are portions of the draw-out electrode. The second metal layer includes, for example, at least one of Al (aluminum) or Cu (copper). For example, the second metal layer includes Al.

The inter-layer insulating layer 13 is provided between the first connector 15a of the signal line SL and the semiconductor layer 12 and between the second connector 15b of the draw-out electrode and the semiconductor layer 12. As described above, the first connecting conductive unit 15c and the second connecting conductive unit 15d are provided inside the inter-layer insulating layer 13.

The inter-layer insulating layer 13 includes, for example, an oxide, a nitride, etc. The inter-layer insulating layer 13 includes, for example, at least one of silicon oxide, silicon nitride, or silicon oxynitride.

In FIG. 5, the common line CL is provided on the second metal layer of the signal line SL, etc. A first insulating layer I1 is provided between the common line CL and the signal line SL. The first insulating layer I1 is provided between the multiple signal lines SL and the multiple common lines CL.

For example, the first insulating layer I1 functions as a planarization layer. For example, the first insulating layer I1 includes an organic material. The first insulating layer I1 includes, for example, at least one of an acrylic resin or a polyimide resin. Good flatness is obtained by using the organic material as the first insulating layer I1. Instead of the organic material, an inorganic material may be used as the first insulating layer I1.

The pixel electrode Px is provided on the common line CL. In FIG. 5, the pixel electrode Px has a comb-shaped configuration; and the pixel electrode Px includes multiple portions Pxs having band configurations. The multiple portions Pxs are separated from each other in the X-Y plane. The pixel electrode Px is electrically connected to the second connector 15b. In FIG. 5, a third connecting conductive unit 17 which is a portion of the pixel electrode Px is electrically connected to the second connector 15*b*.

For example, a light-transmissive conductive layer is used as at least one of the common line CL or the pixel electrode Px. For example, at least one of the common line CL or the pixel electrode Px includes an oxide including at least one element selected from the group consisting of In, Sn, Zn, and Ti. The common line CL and the pixel electrode Px include, for example, ITO (Indium Tin Oxide), etc. For example, thin metal layers that are light-transmissive may be used as the common line CL and the pixel electrode Px. As described below, a supplemental line may be provided for the common line CL.

A second insulating layer 12 is provided between the pixel electrode Px and the common line CL. In FIG. 5, at least a portion of the multiple common lines CL is disposed between at least a portion of one of the multiple pixel electrodes Px and at least a portion of one of the multiple signal lines SL. Also, the second insulating layer 12 is disposed between the at least a portion of the multiple common lines CL recited above and the at least a portion of the one of the multiple pixel electrodes Px recited above.

The second insulating layer 12 may include, for example, the same material as the first insulating layer I1; or a different material may be used. The material of the second insulating layer 12 is arbitrary.

In FIG. 5, a first alignment film 18 is provided on the pixel electrode Px.

The second substrate unit 20*u* is separated from the first substrate unit 10*u* in the Z-axis direction. In FIG. 5, the second substrate unit 20*u* includes the second substrate 20, a color filter layer 25, a second alignment film 28, and the sense lines RL (the fourth lines L4). The sense lines RL are separated from the switch elements 11 and the multiple pixel electrodes Px. The second substrate 20 is provided between the sense lines RL and the first substrate unit 10*u*. The color filter layer 25 is provided between the second substrate 20 and the first substrate unit 10*u*. The second alignment film 28 is provided between the color filter layer 25 and the first substrate unit 10*u*.

In FIG. 5, the second substrate 20 is light-transmissive. The second substrate 20 includes, for example, glass or a resin.

For example, a light-transmissive conductive material is used as the material of the sense line RL. The sense line RL includes an oxide (e.g., the ITO, etc.) including at least one element selected from the group consisting of In, Sn, Zn, and Ti, etc. A thin metal layer that is light-transmissive may be used as the sense line RL. A metal line may be used as the sense line RL. In the case where the metal line is used as the sense line RL, it is favorable for the metal line to be as fine as possible to not be visible. Also, in the case where the metal line is used as the sense line RL, it is necessary to suppress moiré that occurs due to the relationship of the arrangement between the metal lines, the arrangement between the metal line and the color filter layer 25 described below, and the arrangement between the metal line and the pixels. To suppress the moiré, the metal lines may have a configuration in which metal pieces having a prescribed length are disposed with a prescribed angle between mutually-adjacent metal pieces.

The color filter layer 25 includes, for example, a red colored layer, a green colored layer, a blue colored layer, etc. In the example, a light-shielding layer BM that shields the TFT is formed in the same layer as the color filter layer 25. The red colored layer, the green colored layer, and the blue colored layer are disposed to respectively correspond to the multiple pixels 35. The color filter layer 25 may have four or more colors. In the embodiment, the color filter layer 25 may be omitted. The color filter layer 25 may be provided in the first substrate unit 10*u*.

The first alignment film 18 and the second alignment film 28 include, for example, polyimide, etc. Alignment processing (e.g., rubbing, etc.) of these alignment films is performed as necessary. Or, a photo-alignment film may be used as the alignment film. For example, a photo-alignment film that is formed from a polyimide precursor may be used as such a photo-alignment film.

The display function layer 30 is provided between the first substrate unit 10*u* and the second substrate unit 20*u*. The display function layer 30 is disposed between the multiple pixel electrodes Px and the multiple sense lines RL. For example, the display function layer 30 is disposed between the first alignment film 18 and the second alignment film 28.

A first polarizing layer 51 and a second polarizing layer 52 are provided in FIG. 5. The first substrate unit 10*u* is disposed between the first polarizing layer 51 and the second polarizing layer 52. The second substrate unit 20*u* is disposed between the first substrate unit 10*u* and the second polarizing layer 52.

A backlight unit 55 is further provided in FIG. 5. The first polarizing layer 51, the first substrate unit 10*u*, the display function layer 30, and the second substrate unit 20*u* are disposed between the backlight unit 55 and the second polarizing layer 52. The backlight unit 55 emits light. The light passes through the first polarizing layer 51, the first substrate unit 10*u*, the display function layer 30, the second substrate unit 20*u*, and the second polarizing layer 52 and is emitted outside the display device 110. The light that is modulated by the display function layer 30 is visible as an image.

In FIG. 5, the pixel electrode Px includes the multiple portions Pxs. A "lateral electric field" is generated between the pixel electrode Px and the common line CL. The lateral electric field is an electric field having a component parallel to the X-Y plane. The director (the long-axis direction of the liquid crystal molecules) of the liquid crystal molecules of the display function layer 30 (the liquid crystal layer) is caused to change in the X-Y plane by the lateral electric field. For example, at least one of birefringence or optical rotatory properties changes due to the change of the direction of the director. In other words, a change of an optical characteristic occurs. The change of the optical characteristic is converted to a change of the transmittance by using a polarizing layer.

The transmittance of the light emitted from the backlight unit 55 changes due to the change of the optical characteristic. The transmittance of the light changes, that is, the brightness changes, according to the electrical signal (the image signal) applied to the pixel electrode Px. The light of which the brightness has changed is emitted from an upper surface Uf of the display device 110. Thereby, the display is performed.

On the other hand, as described above, the touch input to the upper surface Uf of the display device 110 is sensed by the multiple sense lines RL and the multiple common lines CL from the change of the electrostatic capacitance that is formed. The touch input may be sensed by sensing at least one of an electric field formed between the multiple sense lines RL and a finger of a viewer, an input member, etc., or an electric field formed between the multiple common lines CL and the finger of the viewer, the input member, etc.

At least a portion of the drive unit 60 may be provided in the first substrate unit 10*u*. At least a portion of the drive unit 60 may be included in the drive device of the display device. At least a portion of the drive device may be included in the drive unit 60.

An example of the drive element 71 and the control circuit unit 75 of the display device 110 will now be described.

Figure 6:
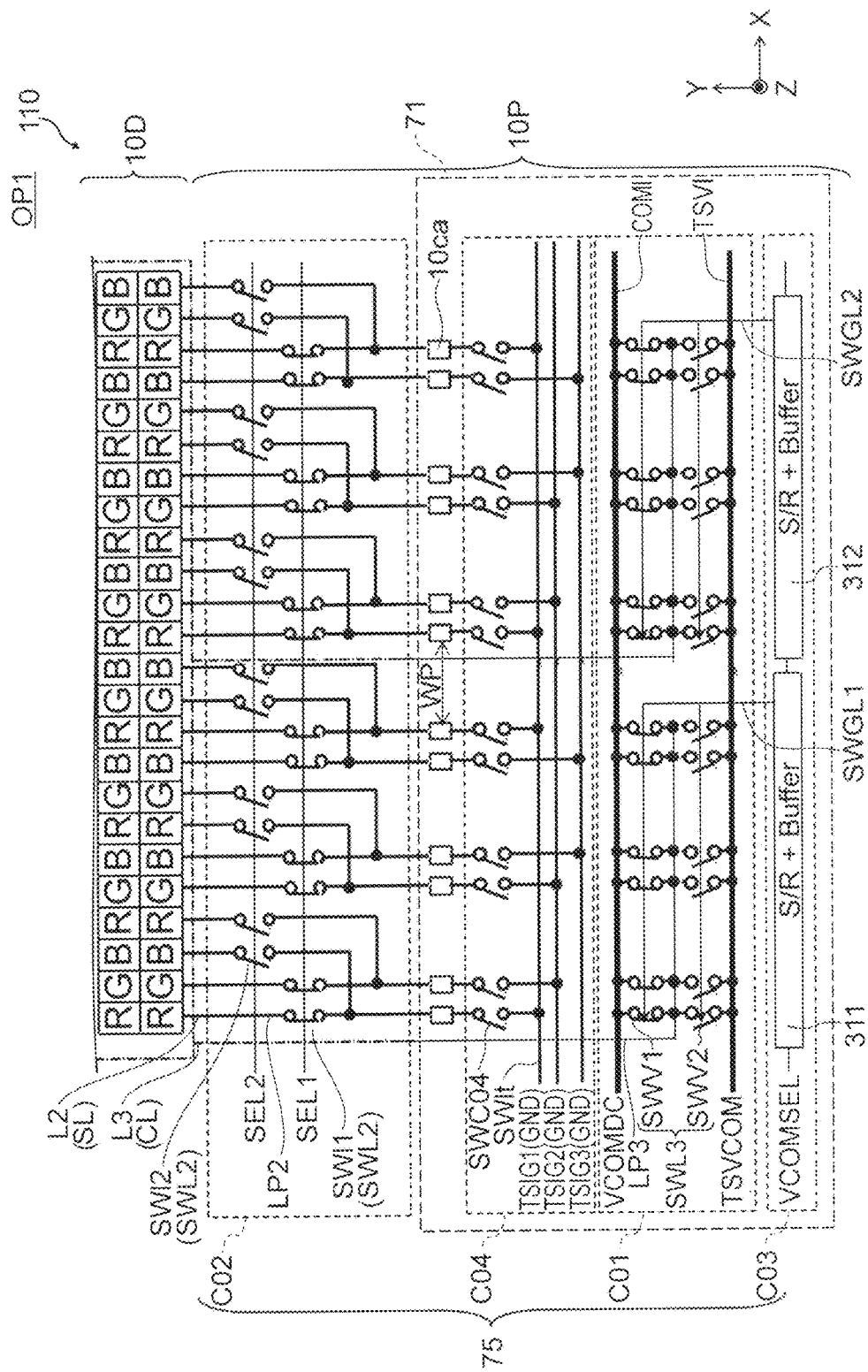
FIG. 6 is a schematic view illustrating the display device according to the first embodiment.

FIG. 6 is a schematic view illustrating the display device according to the first embodiment.

FIG. 6 illustrates a portion of the display device 110.

As illustrated in FIG. 6, the control circuit unit 75 is provided in the peripheral region 10P. The control circuit unit 75 includes a first circuit unit C01. The first circuit unit C01 includes third line connection lines LP3 and third line switches SWL3.

The third line connection line LP3 is electrically connected to at least one of the multiple third lines L3 (e.g., the common lines CL). The third line switch SWL3 is electrically connected to the third line connection line LP3.

In the example, the first circuit unit C01 further includes a display counter potential line COMI and a sense potential line TSVI. The display counter potential line COMI and the sense potential line TSVI are provided in the peripheral region 10P. The display counter potential line COMI is set to a display counter potential VCOMDC. The sense potential line TSVI is set to a sense potential TSVCOM. The sense potential TSVCOM is a potential that is different from the display counter potential VCOMDC.

The display counter potential VCOMDC is, for example, 0 volts (e.g., the ground potential) to −1 volts. This value is an example; and the embodiment is not limited to this value. The sense potential TSVCOM is 4 volts to 10 volts. This value is an example; and the embodiment is not limited to this value.

In the example, the third line switches SWL3 include a first potential switch SWV1 and a second potential switch SWV2.

One end of the first potential switch SWV1 is electrically connected to the display counter potential line COMI. The other end of the first potential switch SWV1 is electrically connected to the third line connection line LP3. One end of the second potential switch SWV2 is electrically connected to the sense potential line TSVI. The other end of the second potential switch SWV2 is electrically connected to the third line connection line LP3.

For example, the potential of the third line connection line LP3 connected to the third line L3 is set to one of the display counter potential VCOMDC or the sense potential TSVCOM by the operations of the first potential switch SWV1 and the second potential switch SWV2.

In the example, the control circuit unit 75 further includes a third circuit unit C03. The third circuit unit C03 is provided in the peripheral region 10P. The third circuit unit C03 controls the operation of the first potential switch SWV1 and the operation of the second potential switch SWV2 recited above. The third circuit unit C03 includes, for example, a first shift register 311 and a second shift register 312. The outputs of the shift registers are supplied to the gate of the first potential switch SWV1 and the gate of the second potential switch SWV2 via a first control line SWGL1 and a second control line SWGL2, respectively. For example, buffer functions are built into these shift registers.

At least a portion of the first circuit unit C01 is disposed between the drive element 71 and the first substrate 10. In the example, at least a portion of the third circuit unit C03 also is disposed between the drive element 71 and the first substrate 10. As described below, the function of the third circuit unit C03 may be provided inside the drive element 71.

In the example, the control circuit unit 75 further includes a second circuit unit C02 and the connection electrode 10ca. The second circuit unit C02 and the connection electrode 10ca are provided in the peripheral region 10P.

The connection electrode 10ca is electrically connected to the drive element 71. As described above, for example, the first connection member 72a is used as this connection. The output (the source output) of the drive element 71 is supplied to the connection electrode 10ca. The connection electrode 10ca is, for example, a pad electrode.

The second circuit unit C02 includes second line switches SWL2 and second line connection lines LP2. One end of the second line switch SWL2 is electrically connected to the connection electrode 10ca. The other end of the second line switch SWL2 is electrically connected to the second line connection line LP2. The second line connection line LP2 electrically connects the other end of the second line switch SWL2 to one of the multiple second lines L2 (e.g., the signal lines SL).

In the example, the second line switches SWL2 include a first signal line switch SWI1 and a second signal line switch SWI2. For example, one end of the first signal line switch SWI1 is electrically connected to the signal line SL corresponding to the first color (e.g., red) via one of the second line connection lines LP2. For example, one end of the second signal line switch SWI2 is electrically connected to the signal line SL corresponding to the second color (e.g., green) via one other of the second line connection lines LP2. Similarly, the signal line SL that corresponds to the third color (e.g., blue) is connected to the signal line switch via yet another one of the second line connection lines LP2. The electrical signals that are output from the drive element 71 are supplied to the second lines L2 via the signal line switches (the second line switches SWL2). For example, the polarity of the electrical signal of the connection electrode 10ca connected to the first signal line switch SWI1 is the reverse of the polarity of the electrical signal of the connection electrode 10ca connected to the second signal line switch SWI2.

The drive element 71 supplies the electrical signal for the display to one of the second lines L2 (each of the second lines L2) via the connection electrode 10ca, the second line switch SWL2, and the second line connection line LP2.

In the example, the second circuit unit C02 is not disposed between the drive element 71 and the first substrate 10. In other words, the drive element 71 and at least a portion of the second circuit unit C02 do not overlap when projected onto the first surface 10a of the first substrate 10.

In the example, the control circuit unit 75 further includes a fourth circuit unit C04. For example, the fourth circuit unit C04 is provided in the peripheral region 10P. The fourth circuit unit C04 includes lines SWIt and fourth circuit switches SWC04. The lines SWIt are set to a prescribed potential. The lines SWIt include, for example, lines TSIG1 to TSIG3, etc. One end of the fourth circuit switch SWC04 is electrically connected to the line SWIt set to the prescribed potential recited above. The other end of the fourth circuit switch SWC04 is electrically connected to the drive element 71. Specifically, the other end of the fourth circuit switch SWC04 is electrically connected to the connection electrode 10ca.

For example, at least a portion of the fourth circuit unit C04 is disposed between the drive element 71 and the first substrate 10. For example, the fourth circuit unit C04 is used to test the display. The fourth circuit unit C04 is provided as necessary and may be omitted.

The first circuit unit C01 is, for example, a common line switch block (COMSW block). The second circuit unit C02 is, for example, a signal line switch block. The third circuit unit C03 is, for example, a scanner block. The fourth circuit unit C04 is a test switch block.

In the example, the first circuit unit C01 is disposed between the display region 10D and the region of the third circuit unit C03 on the first surface 10a. The fourth circuit unit C04 is disposed between the display region 10D and the region of the first circuit unit C01. The second circuit unit C02 is disposed between the display region 10D and the region of the fourth circuit unit C04.

For example, the third line connection line LP3 passes through the region of the fourth circuit unit C04 and the region of the second circuit unit C02 from the region of the first circuit unit C01 and extends to the display region 10D. The portion of the third line connection line LP3 positioned inside the region of the first circuit unit C01 and inside the region of the fourth circuit unit C04 includes, for example, Al. The width of this Al line is, for example, not less than 10 μm and not more than 50 μm, e.g., not less than 25 μm and not more than 35 μm. The portion of the third line connection line LP3 positioned inside the region of the second circuit unit C02 includes, for example, a metal layer (e.g., Al) of the third layer. The width of this metal layer is, for example, more than 50 μm but not more than 200 μm, e.g., not less than 80 μm and not more than 120 μm.

For example, multiple connection electrodes 10ca are provided. In the example, one connection electrode 10ca corresponds to two second lines L2 for the second line switches SWL2 (the first signal line switch SWI1 and the second signal line switch SWI2).

The distance between some of the multiple connection electrodes 10ca is set to a first spacing (a pad spacing). The distance between other multiple connection electrodes 10ca is set to a second spacing. The second spacing is set to about 2 times (e.g., not less than 1.5 times and not more than 2.5 times) the first spacing.

In other words, the third line connection line LP3 passes through one of the regions between the multiple connection electrodes 10ca. The spacing between the multiple connection electrodes 10ca at the position where the third line connection line LP3 passes through is set to the second spacing WP. The spacing between the multiple connection electrodes 10ca is set to the first spacing in the portions of the regions between the multiple connection electrodes 10ca where the third line connection line LP3 does not pass through.

Examples of operations of the display device 110 will now be described.

As described above, the drive unit 60 further includes the controller 63 that is electrically connected to the control circuit unit 75 and the drive element 71. The controller 63 causes the control circuit unit 75 and the drive element 71 to implement a first operation and a second operation.

FIG. 6 illustrates the first operation OP1. The display device 110 performs a display in the first operation OP1. For example, a display period and a non-display period are provided. The first operation OP1 is implemented in the display period. In the display period of the first operation OP1, one of the multiple switch elements 11 that is connected to one of the multiple first lines L1 and one of the multiple second lines L2 are selected. The switch element 11 that is selected is referred to as the selection switch element 11s. The image potential is applied to the pixel electrode (the selection pixel electrode Pxsl) of the multiple pixel electrodes Px electrically connected to the selection switch element 11s. On the other hand, the display counter potential VCOMDC is applied to at least one of the multiple third lines L3.

In other words, in the display period of the first operation OP1, the image signal is supplied to the multiple second lines L2 while setting one of the multiple first lines L1 to the select potential.

As described in regard to FIG. 4, the selection pixel electrode Pxsl (the pixel electrode Px of the multiple pixel electrodes Px electrically connected to the selection switch element 11s) is set to the image potential based on the image signal via the selection switch element 11s (the switch element 11 of the multiple switch elements 11 electrically connected to the first line L1 set to the select potential). At least one of the multiple third lines L3 is set to the display counter potential VCOMDC.

As illustrated in FIG. 6, in the first operation OP1, the first potential switches SWV1 are in the conducting state; and the second potential switches SWV2 are in the nonconducting state. Thereby, the third lines L3 are set to the display counter potential VCOMDC.

The conducting state is a low resistance state. The nonconducting state is a high resistance state. In a switch in the conducting state, a current is conductible between one end and the other end. In the switch in the nonconducting state, the current substantially does not flow between the one end and the other end.

On the other hand, in the example, at one time, the first signal line switches SWI1 are in the conducting state; and the second signal line switches SWI2 are in the nonconducting state. Thereby, for example, the writing is performed to a red pixel and a green pixel. At another time (not shown), the first signal line switches SWI1 are switched to the nonconducting state; and the second signal line switches SWI2 are switched to the conducting state. Thereby, the writing is performed to a blue pixel and another red pixel.

As illustrated in FIG. 6, the fourth circuit switches SWC04 are in the nonconducting state in the first operation OP1.

Thus, the display is performed in the display device 110.

An example of the second operation will now be described.

Figure 7:
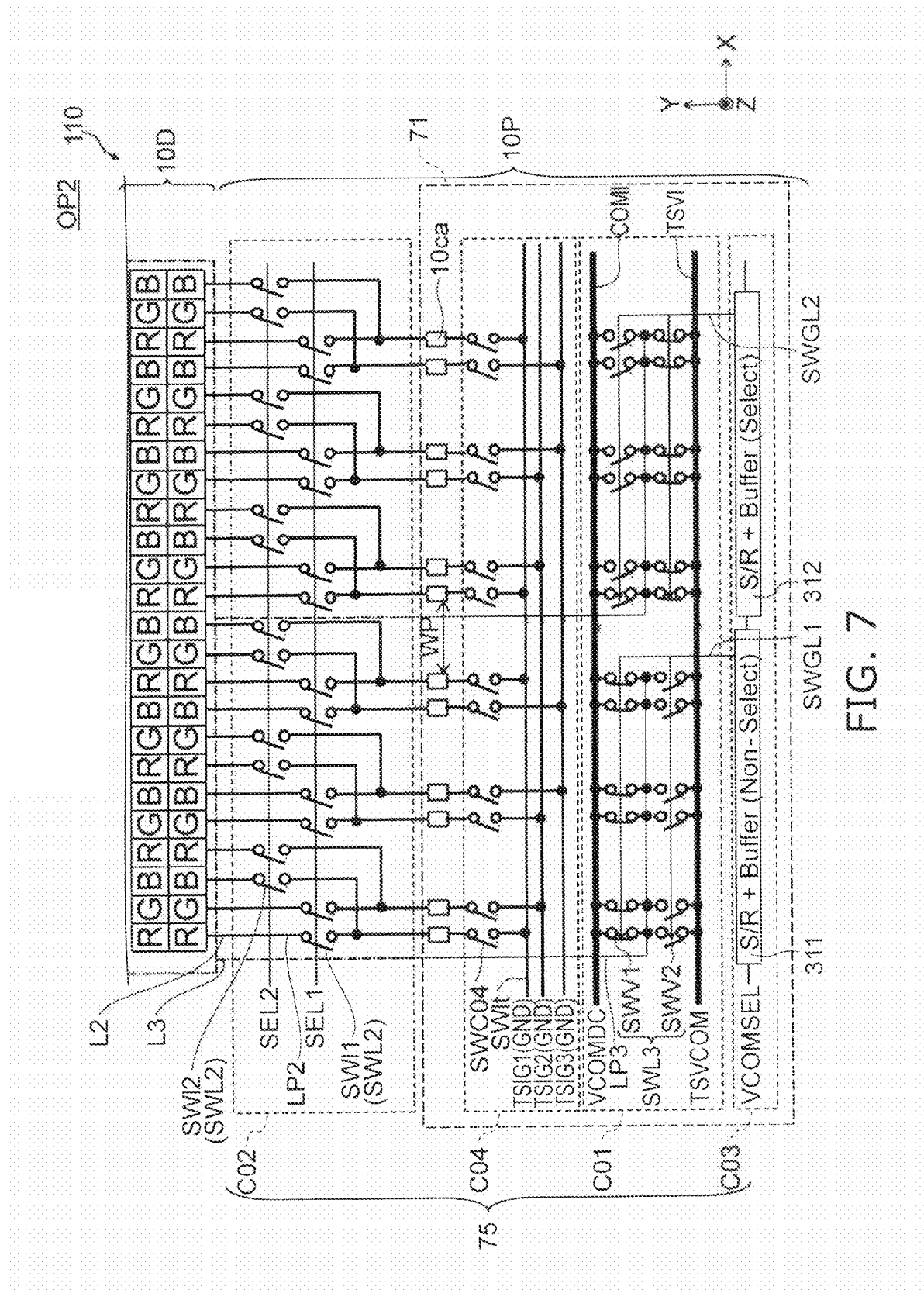
FIG. 7 is a schematic view illustrating the display device according to the first embodiment.

FIG. 7 is a schematic view illustrating the display device according to the first embodiment.

FIG. 7 illustrates the second operation OP2 of the display device 110. For example, the sensing of the touch input is performed in the second operation OP2. The second operation OP2 is implemented in the non-display period.

As described above, in the second operation OP2, the current that flows between at least one of the multiple fourth lines L4 and at least one of the multiple third lines L3 is sensed. In other words, the change of the current is sensed based on the change of the capacitance between the at least one of the multiple fourth lines L4 and the at least one of the multiple third lines L3 due to an object proximal to at least one of the multiple fourth lines L4.

For example, a high frequency signal is input to the third lines L3 (the common lines CL) in the selected state corresponding to the sense operation. In the high frequency signal, the voltage is switched alternately between the display counter potential VCOMDC and the sense potential TSVCOM. For example, the operation is performed by the first potential switches SWV1 and the second potential switches SWV2. The operation is controlled by the third circuit unit C03 (e.g., the second shift register 312 in the selected state). Using the high frequency signal, the current that flows between the third lines L3 and the fourth lines L4 is sensed.

On the other hand, for example, the third lines L3 in the unselected state are set to the display counter potential VCOMDC or the sense potential TSVCOM.

At this time, in the second operation OP2 as illustrated in FIG. 7, the second line switches SWL2 (e.g., the first signal line switch SWI1, the second signal line switch SWI2, etc.) are switched to the nonconducting state. In other words, in the second operation OP2, the potential of at least one of the multiple second lines L2 is set to a floating potential. Thereby, the capacitance formed between the second lines L2 and the third lines L3 can be reduced. Thereby, in the second operation OP2, the speed of the change of the potential of the third lines L3 can be increased.

In the embodiment, for example, at least a portion of the control circuit unit 75 is formed of a material included in the display unit DP.

For example, the switches (e.g., the third line switch SWL3, etc.) that are included in the control circuit unit 75 include the same material as the semiconductor layer 12 included in the switch element 11.

For example, the circuit units (e.g., the first circuit unit C01, etc.) include the same material as the metal layer included in at least one of the first to third lines L1 to L3.

For example, at least a portion of the control circuit unit 75 may be formed together with the formation of the display unit DP. Thereby, the processes are simple.

Figure 8A:
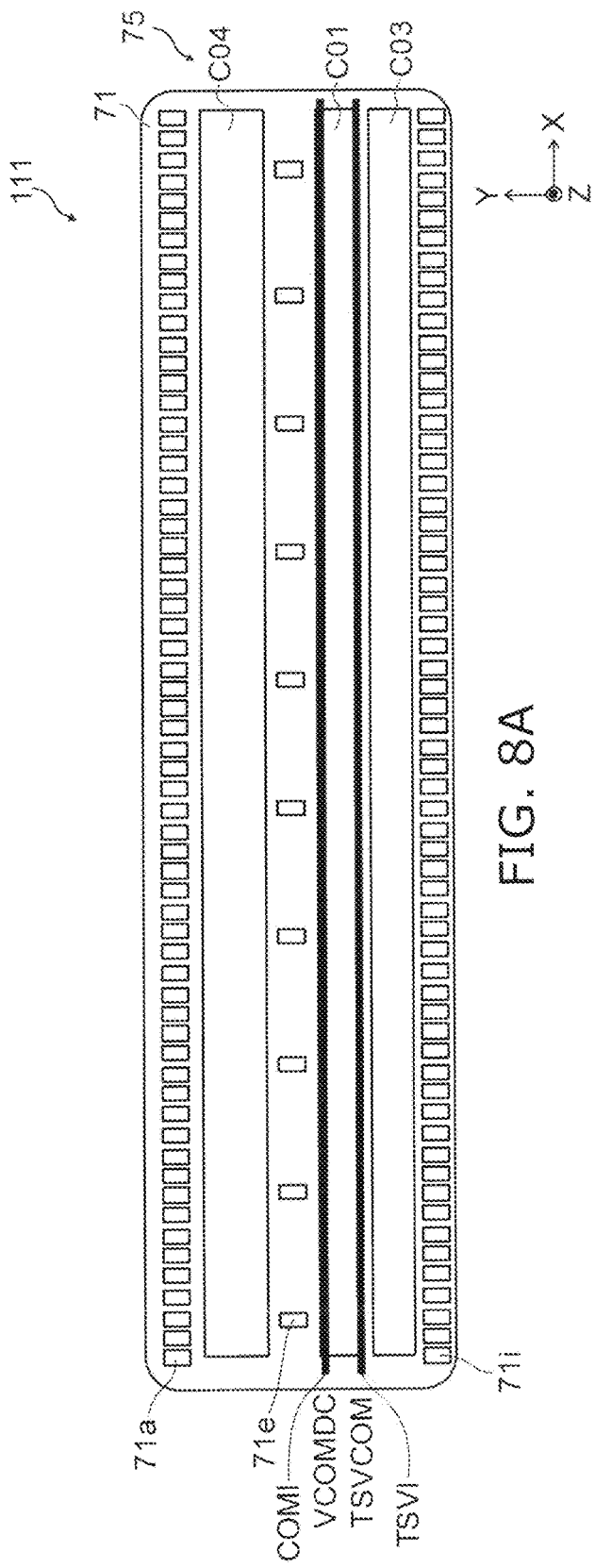
FIG. 8A and FIG. 8B are schematic views illustrating another display device according to the first embodiment.
Figure 8B:
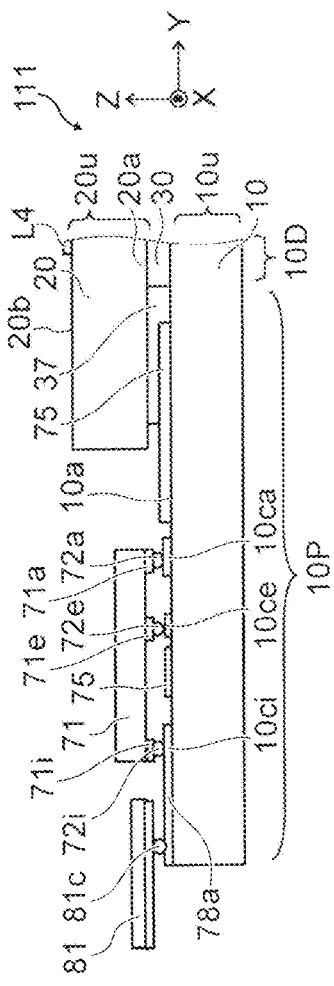

FIG. 8A and FIG. 8B are schematic views illustrating another display device according to the first embodiment.

FIG. 8A is a schematic see-through plan view illustrating the drive element 71 and the control circuit unit 75 of the display device 111 according to the embodiment. FIG. 8B is a schematic cross-sectional view corresponding to the line A1-A2 cross section of FIG. 1A.

As illustrated in FIG. 8A, the first output electrode 71a and the input electrode 71i are provided in the drive element 71. An electrode layer 71e is further provided in the example. The thickness of the electrode layer 71e is, for example, substantially the same as the thickness of the first output electrode 71a and substantially the same as the thickness of the input electrode 71i.

As illustrated in FIG. 8B, the display device 111 further includes a control connection member 72e. On the other hand, in the example, the first substrate unit 10u further includes an electrode film 10ce. The control connection member 72e and the electrode film 10ce are not shown in FIG. 8A.

The electrode film 10ce is provided in the peripheral region 10P on the first substrate 10 (on the first surface 10a). The control connection member 72e is disposed between the electrode layer 71e and the electrode film 10ce. In other words, the control connection member 72e is disposed between the drive element 71 and the first substrate 10. The control connection member 72e controls the distance between the drive element 71 and the first substrate 10.

For example, an island bump is formed of at least one of the electrode layer 71e, the control connection member 72e, or the electrode film 10ce. For example, the island bump may be set to the ground potential or the floating potential.

The drive element 71 has a relatively large size. Strain occurs easily in at least one of the drive element 71 or the first substrate 10. A stable connection can be ensured by using the control connection member 72e to control the distance between the drive element 71 and the first substrate 10 to be constant. High reliability is obtained.

FIG. 9A and FIG. 9B are schematic views illustrating another display device according to the first embodiment.

FIG. 9A is a schematic see-through plan view illustrating the drive element 71 and the control circuit unit 75 of the display device 112 according to the embodiment. FIG. 9B is a schematic cross-sectional view corresponding to the line A1-A2 cross section of FIG. 1A.

In addition to the first output electrode 71a and the input electrode 71i, a second output electrode 71b is provided in the drive element 71 as illustrated in FIG. 9A. For example, the thickness of the second output electrode 71b is substantially the same as the thickness of the first output electrode 71a and substantially the same as the thickness of the input electrode 71i. For example, the second output electrode 71b is capable of outputting the display counter potential VCOMDC.

As illustrated in FIG. 9B, the second output electrode 71b is provided on the surface of the drive element 71 on the first substrate 10 side.

The display device 112 further includes a second connection member 72b. The second connection member 72b is disposed between the second output electrode 71b and the display counter potential line COMI. The second connection member 72b electrically connects the second output electrode 71b and the display counter potential line COMI.

In the example, the display counter potential VCOMDC is output from the second output electrode 71b of the drive element 71. The display counter potential VCOMDC is supplied to the display counter potential line COMI via the second connection member 72b.

In the display device 111, the control connection member 72e is used to control the distance between the drive element 71 and the first substrate 10. Conversely, in the display device 112, the second connection member 72b is used as the supply path of the display counter potential VCOMDC while controlling the distance between the drive element 71 and the first substrate 10. In the display device 112, the surface area of the peripheral region 10P can be reduced further.

In the display device 112, an island bump is used as the supply path of the display counter potential VCOMDC. Thereby, for example, the size of the switches included in the circuit units (e.g., the first circuit unit C01, the third circuit unit C03, etc.) can be increased. The impedance of the switches can be reduced.

Figure 10A:
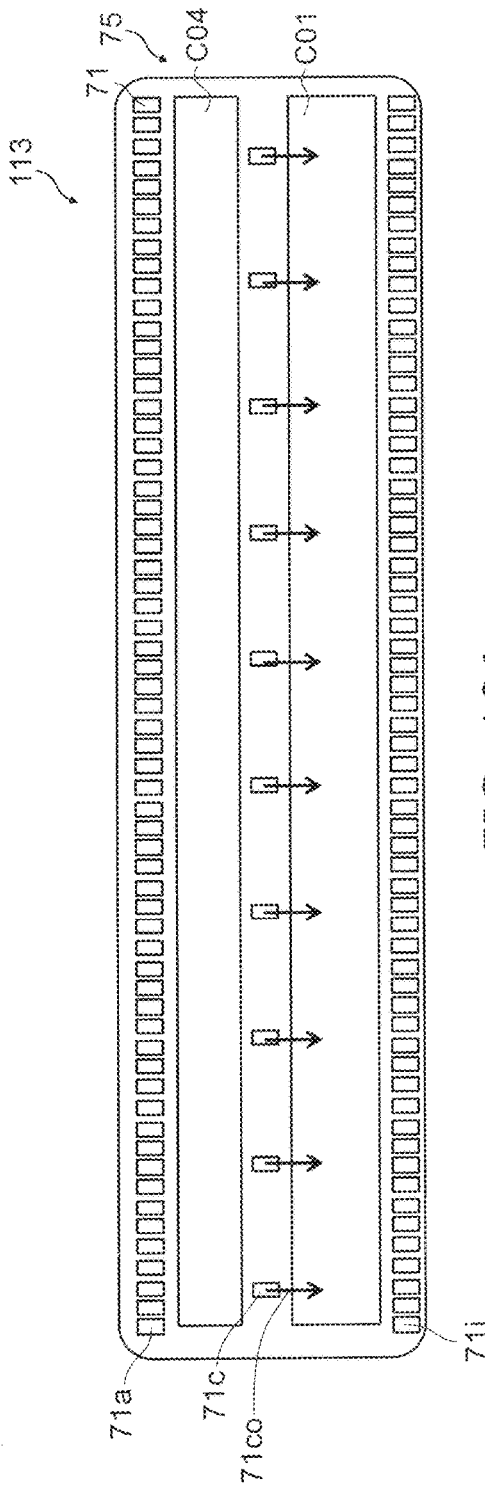
FIG. 10A and FIG. 10B are schematic views illustrating another display device according to the first embodiment.
Figure 10B:
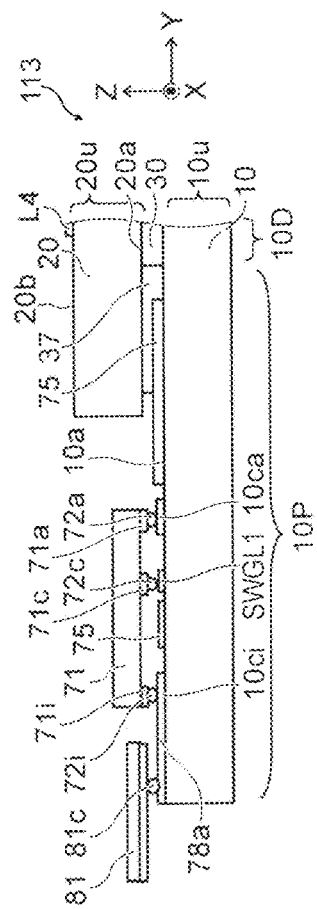

FIG. 10A and FIG. 10B are schematic views illustrating another display device according to the first embodiment.

FIG. 10A is a schematic see-through plan view illustrating the drive element 71 and the control circuit unit 75 of the display device 113 according to the embodiment. FIG. 10B is a schematic cross-sectional view corresponding to the line A1-A2 cross section of FIG. 1A.

Figure 11:
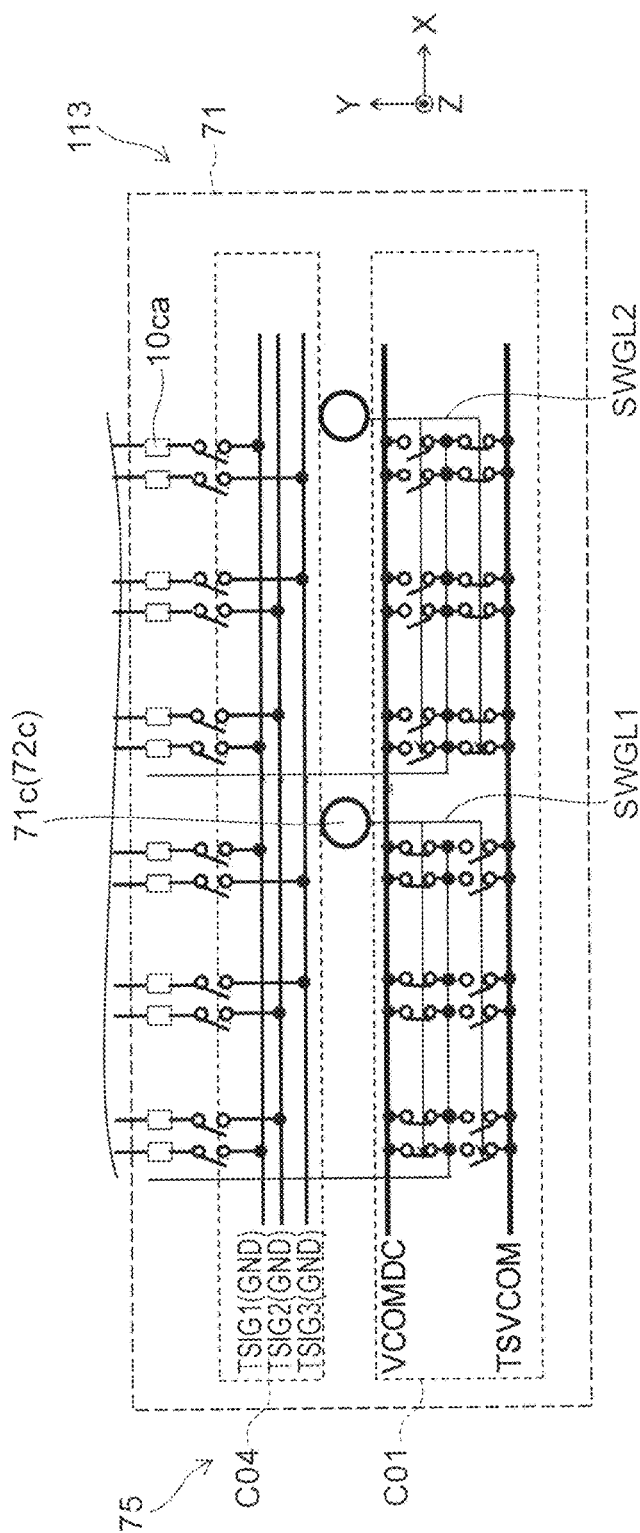
FIG. 11 is a schematic view illustrating the display device according to the first embodiment.

FIG. 11 is a schematic view illustrating the display device according to the first embodiment.

FIG. 11 is a schematic plan view illustrating the drive element 71 and the control circuit unit 75 of the display device 113.

In the example, the drive element 71 functions as the third circuit unit C03. For example, the first shift register 311, the second shift register 312, etc., are provided inside the drive element 71.

As shown in FIG. 10A and FIG. 11, third output electrodes 71c are provided in the drive element 71. For example, an output 71co is output from the third output electrodes 71c to the shift registers (the first shift register 311, the second shift register 312, etc.). In other words, the third output electrodes 71c output the control signals of the third line switches SWL3.

As illustrated in FIG. 10B, the display device 113 further includes third connection members 72c. The third output electrodes 71c are provided on the surface of the drive element 71 on the first substrate 10 side.

The third connection member 72c is disposed between the third output electrode 71c and the first control line SWGL1 (or the second control line SWGL2, etc.). The third connection member 72c electrically connects the third output electrode 71c and the first control line SWGL1. In other words, the third connection member 72c is provided between the third output electrode 71c and the first substrate 10.

In the example, the control signals of the third line switches SWL3 (the first potential switch SWV1, the second potential switch SWV2, etc.) are output from the third output electrodes 71c of the drive element 71. The control signals are supplied to the third line switches SWL3 via the third connection member 72c.

In the display device 113, the control pulse of the first circuit unit C01 is output from the island bump. In the display device 113, the surface area of the peripheral region 10P can be reduced. Or, in the display device 113, for example, the surface area of the region where the first circuit unit C01 is provided can be enlarged. For example, the surface area of the switches provided in the first circuit unit C01 can be enlarged; and the impedance of the switches can be reduced.

In the display device 113, for example, the control pulse of the first circuit unit C01 can be output from any bump. Thereby, any of the third lines L3 can be switched to the selected state. Thereby, for example, random access sensing is possible in the sense operation of the touch input. Operations having higher efficiency are possible.

Second Embodiment

Figure 12:
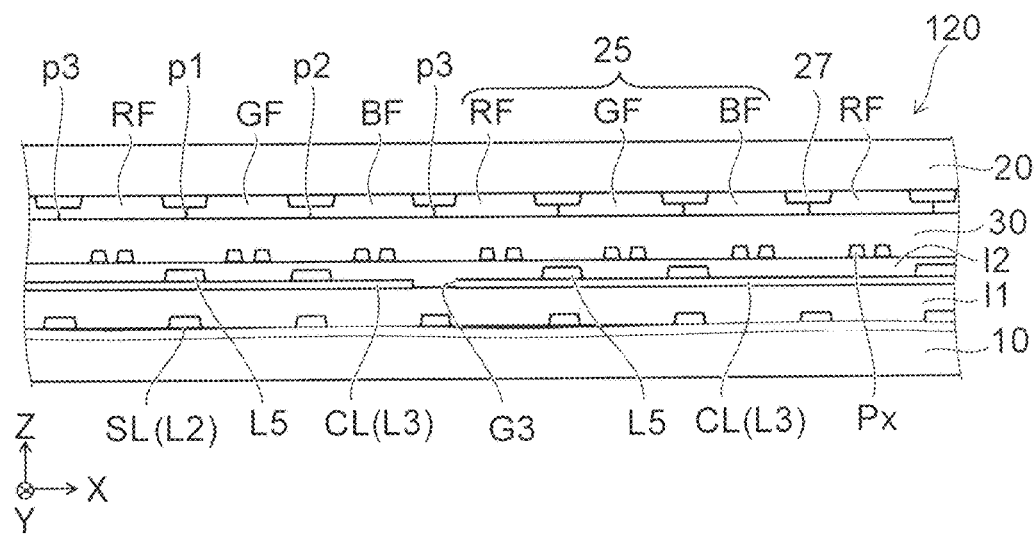
FIG. 12 is a schematic cross-sectional view illustrating a portion of a display device according to a second embodiment.

FIG. 12 is a schematic cross-sectional view illustrating a portion of a display device according to a second embodiment.

As shown in FIG. 12, the color filter layer 25 and multiple fifth lines L5 are further provided in the display device 120 according to the embodiment. Otherwise, the configuration described in regard to the display device 110 (or the display devices 111 to 113) is applicable.

The color filter layer 25 includes a red filter layer RF, a green filter layer GF, and a blue filter layer BF.

The color filter layer 25 includes a first boundary portion p1, a second boundary portion p2, and a third boundary portion p3. The first boundary portion p1 is the boundary portion between the red filter layer RF and the green filter layer GF. The second boundary portion p2 is the boundary portion between the green filter layer GF and the blue filter layer BF. The third boundary portion p3 is the boundary portion between the blue filter layer BF and the red filter layer RF.

The multiple fifth lines L5 extend in the second direction (e.g., the Y-axis direction). Each of the multiple fifth lines L5 is electrically connected to one of the multiple third lines L3. The electrical resistance of each of the multiple fifth lines L5 is lower than the electrical resistance of each of the multiple third lines L3. The fifth lines L5 are used as supplemental lines of the third lines L3.

As described above, a light-transmissive conductive material is used as the third line L3. On the other hand, the fifth line L5 includes a material (a metal or the like) having a low resistance. Thereby, the effective resistance of the third line L3 can be reduced. The occurrence of crosstalk can be suppressed. For example, the decrease of the opening ratio can be suppressed.

In the example, the multiple fifth lines L5 overlap the first boundary portion p1 or the second boundary portion p2 when projected onto the X-Y plane. The fifth lines L5 and the third boundary portion p3 may not overlap.

The transmittance of the fifth line L5 is relatively low. The fifth line L5 functions as a light-shielding film. Because the visibility of green is high, there is a possibility that light leakage may occur at the first boundary portion p1 and the second boundary portion p2. In such a case, the light leakage can be suppressed by providing the fifth lines L5 so that the fifth line L5 and the first boundary portion p1 overlap, and the fifth line L5 and the second boundary portion p2 overlap. The display quality increases. On the other hand, the light leakage is suppressed at the third boundary portion p3 which is the boundary portion between red and blue which have low visibilities. Therefore, the fifth line L5 and the third boundary portion p3 may not overlap.

In the example, the third boundary portion p3 and at least one of gaps G3 between the multiple third lines L3 overlap when projected onto the X-Y plane. A uniform display is obtained easily by disposing the gap G3 at the position of the third boundary portion p3 where the light leakage is low.

As illustrated in FIG. 12, a light-shielding layer 27 (e.g., a black matrix) may be further provided. When projected onto the X-Y plane, the light-shielding layer 27 has a portion that overlaps the first boundary portion p1, the second boundary portion p2, and the third boundary portion p3. Thereby, the light leakage can be suppressed further; and a higher-quality display is obtained.

The light-shielding layer 27 includes chrome, a chromic compound, etc. A black resin may be used as the light-shielding layer 27. A stacked film in which two or more of the red filter layer RF, the green filter layer GF, or the blue filter layer BF are stacked may be used as the light-shielding layer 27.

The configuration and operations described in regard to the first embodiment may be combined with the second embodiment.

Third Embodiment

Figure 13:
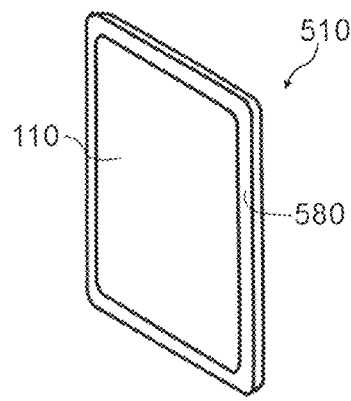
FIG. 13 is a schematic perspective view illustrating an electronic device according to a third embodiment.

FIG. 13 is a schematic perspective view illustrating an electronic device according to a third embodiment.

As shown in FIG. 13, an electronic device 510 according to the embodiment includes the display device 110. The display devices and the modifications of the display devices described in regard to the first and second embodiments may be used as the display device. In the example, the electronic device 510 further includes a housing 580 having an interior in which the display device 110 is contained. For example, a mobile telephone, a personal digital assistant, a personal computer, various information devices, etc., are used as the electronic device 510.

In the electronic device 510 according to the embodiment, a compact electronic device can be provided by using the display devices according to the first and second embodiments.

According to the embodiment, a compact display device can be provided.

In the specification of the application, "perpendicular" and "parallel" include not only strictly perpendicular and strictly parallel but also, for example, the fluctuation due to manufacturing processes, etc.; and it is sufficient to be substantially perpendicular and substantially parallel.

Hereinabove, embodiments of the invention are described with reference to specific examples. However, the invention is not limited to these specific examples. For example, one skilled in the art may similarly practice the invention by appropriately selecting specific configurations of components included in the display device such as the line, the switch element, the display function layer, the insulating layer, the drive unit, the switch, the selector, the circuit, etc., from known art; and such practice is within the scope of the invention to the extent that similar effects can be obtained.

Further, any two or more components of the specific examples may be combined within the extent of technical feasibility and are within the scope of the invention to the extent that the spirit of the invention is included.

All display devices practicable by an appropriate design modification by one skilled in the art based on the display devices described above as embodiments of the invention are within the scope of the invention to the extent that the spirit of the invention is included.

Various modifications and alterations within the spirit of the invention will be readily apparent to those skilled in the art; and all such modifications and alterations should be seen as being within the scope of the invention.

For example, additions, deletions, or design modifications of components or additions, omissions, or condition modifications of processes appropriately made by one skilled in the art in regard to the embodiments described above are within the scope of the invention to the extent that the spirit of the invention is included.

Other effects produced by the forms described in the embodiment that are apparent from the specification or readily apparent to one skilled in the art naturally should be seen as being within the scope of the invention.

(1) An embodiment of the disclosed invention is a display device including:
a first substrate unit including
a first substrate having a first surface including a display region and a peripheral region,
a display unit provided in the display region, the display unit including
multiple first lines extending in a first direction and being arranged in a second direction intersecting the first direction, the first direction intersecting a direction from the peripheral region toward the display region,
multiple second lines extending in the second direction and being arranged in the first direction,
multiple switch elements, each of the multiple switch elements being electrically connected to one of the multiple first lines and one of the multiple second lines,
multiple pixel electrodes electrically connected respectively to the multiple switch elements, and
multiple third lines extending in the second direction and being arranged in the first direction, and
a control circuit unit provided in the peripheral region, the control circuit unit including a first circuit unit, the first circuit unit including
a third line connection line electrically connected to at least one of the multiple third lines, and
a third line switch electrically connected to the third line connection line;
a second substrate unit including a second substrate having a second surface and a third surface, the second surface opposing the first surface, the third surface being on a side opposite to the second surface, and
multiple fourth lines provided at the third surface, the multiple fourth lines extending in a third direction and being arranged in a fourth direction, the third direction being parallel to the third surface and intersecting the second direction, the fourth direction being parallel to the third surface and intersecting the third direction;
a display function layer provided between the first substrate unit and the second substrate unit, the display function layer performing an optical operation based on an electrical signal applied to the multiple pixel electrodes; and
a drive element provided on the peripheral region, the drive element being capable of outputting the electrical signal,
at least a portion of the first circuit unit being disposed between the drive element and the first substrate.

(2) An embodiment of the disclosed invention is the display device according to (1), wherein
the control circuit unit further includes a second circuit unit and a connection electrode,
the connection electrode is electrically connected to the drive element,
the second circuit unit includes:
a second line switch having one end electrically connected to the connection electrode; and
a second line connection line electrically connecting one other end of the second line switch and one of the multiple second lines, and
the drive element supplies the electrical signal to the one of the second lines via the connection electrode, the second line switch, and the second line connection line.

(3) An embodiment of the disclosed invention is the display device according to (2), wherein the drive element and at least a portion of the second circuit unit do not overlap when projected onto the first surface.

(4) An embodiment of the disclosed invention is the display device according to (2) or (3), wherein
the first circuit unit further includes:
a display counter potential line provided in the peripheral region, the display counter potential line being set to a display counter potential; and
a sense potential line provided in the peripheral region, the sense potential line being set to a sense potential different from the display counter potential, and
the third line switch includes:
a first potential switch having one end electrically connected to the display counter potential line and one other end electrically connected to the third line connection line; and
a second potential switch having one end electrically connected to the sense potential line and one other end electrically connected to the third line connection line.

(5) An embodiment of the disclosed invention is the display device according to (3) or (4), further including a first connection member,
the drive element including a first output electrode provided at a surface of the drive element on the first substrate side, the first output electrode outputting the electrical signal,
the first connection member being disposed between the first output electrode and the connection electrode and electrically connecting the first output electrode and the connection electrode.

(6) An embodiment of the disclosed invention is the display device according to (4) or (5), further including a second connection member, the drive element including a second output electrode provided at a surface of the drive element on the first substrate side, the second output electrode outputting the display counter potential, the second connection member being disposed between the second output electrode and the display counter potential line and electrically connecting the second output electrode and the display counter potential line.

(7) An embodiment of the disclosed invention is the display device according to (4) or (5), further including a third connection member, the drive element including a third output electrode provided at a surface of the drive element on the first substrate side, the third output electrode outputting a control signal of the third line switch, the third connection member being provided between the third output electrode and the first substrate, the control signal being supplied to the third line switch via the third connection member.

(8) An embodiment of the disclosed invention is the display device according to any one of (4) to (7), including a control connection member disposed between the drive element and the first substrate, the control connection member controlling a distance between the drive element and the first substrate.

(9) An embodiment of the disclosed invention is the display device according to any one of (4) to (8), wherein the control circuit unit further includes a fourth circuit unit, and the fourth circuit unit includes:

an line settable to a prescribed potential; and a fourth circuit switch, one end of the fourth circuit switch being electrically connected to the line settable to the prescribed potential, one other end of the fourth circuit switch being electrically connected to the drive element.

(10) An embodiment of the disclosed invention is the display device according to any one of (4) to (9), further including a controller electrically connected to the control circuit unit and the drive element, the controller causing the control circuit unit and the drive element to implement a first operation, the first operation including, in a display period:

selecting one of the multiple switch elements, the one of the multiple switch elements being connected to one of the multiple first lines and one of the multiple second lines;

applying an image potential to a pixel electrode of the multiple pixel electrodes electrically connected to the selected switch element; and applying a display counter potential to at least one of the multiple third lines.

(11) An embodiment of the disclosed invention is the display device according to (10), wherein the controller further causes the control circuit unit and the drive element to implement a second operation, and in the second operation, in a non-display period, a potential of at least one of the multiple second lines is set to a floating potential.

(12) An embodiment of the disclosed invention is the display device according to (11), including a sensor sensing, in the second operation, a change of a capacitance formed between at least one of the multiple fourth lines and at least one of the multiple third lines.

(13) An embodiment of the disclosed invention is the display device according to any one of (1) to (12), further including:

a color filter layer including a red filter layer, a green filter layer, and a blue filter layer; and multiple fifth lines extending in the second direction, the color filter layer including a first boundary portion between the red filter layer and the green filter layer, a second boundary portion between the green filter layer and the blue filter layer, and a third boundary portion between the blue filter layer and the red filter layer, each of the multiple fifth lines being electrically connected to one of the multiple third lines, an electrical resistance of each of the multiple fifth lines being lower than an electrical resistance of each of the multiple third lines, the multiple fifth lines overlapping the first boundary portion or the second boundary portion and not overlapping the third boundary portion when projected onto a plane including the first direction and the second direction.

(14) An embodiment of the disclosed invention is the display device according to (13), wherein the third boundary portion and at least one of gaps between the multiple third lines overlap when projected onto the plane including the first direction and the second direction.

(15) An embodiment of the disclosed invention is the display device according to any one of (1) to (12), further including a color filter layer including a red filter layer, a green filter layer, and a blue filter layer, the color filter layer including a first boundary portion between the red filter layer and the green filter layer, a second boundary portion between the green filter layer and the blue filter layer, and a third boundary portion between the blue filter layer and the red filter layer, the third boundary portion and at least one of gaps between the multiple third lines overlapping when projected onto the plane including the first direction and the second direction.

What is claimed is:

1. A display device, comprising:
   a first substrate unit including
      a first substrate having a first surface including a display region and a peripheral region,
      a display unit provided in the display region, the display unit including
         a plurality of first lines extending in a first direction and being arranged in a second direction intersecting the first direction, the first direction intersecting a direction from the peripheral region toward the display region,
         a plurality of second lines extending in the second direction and being arranged in the first direction,
         a plurality of switch elements, each of the plurality of switch elements being electrically connected to one of the plurality of first lines and one of the plurality of second lines,
         a plurality of pixel electrodes electrically connected respectively to the plurality of switch elements, and
         a plurality of third lines extending in the second direction and being arranged in the first direction, and
      a control circuit unit provided in the peripheral region, the control circuit unit including a first circuit unit, the first circuit unit including
         a third line connection line electrically connected to at least one of the plurality of third lines, and a third line switch electrically connected to the third line connection line;
a second substrate unit including
a second substrate having a second surface and a third surface, the second surface opposing the first surface, the third surface being on a side opposite to the second surface, and
a plurality of fourth lines provided at the third surface, the plurality of fourth lines extending in a third direction and being arranged in a fourth direction, the third direction being parallel to the third surface and intersecting the second direction, the fourth direction being parallel to the third surface and intersecting the third direction;
a display function layer provided between the first substrate unit and the second substrate unit, the display function layer performing an optical operation based on an electrical signal applied to the plurality of pixel electrodes; and
a drive element provided on the peripheral region, the drive element being capable of outputting the electrical signal,
at least a portion of the first circuit unit being disposed between the drive element and the first substrate.

2. The display device according to claim 1, wherein the control circuit unit further includes a second circuit unit and a connection electrode,
the connection electrode is electrically connected to the drive element,
the second circuit unit includes:
a second line switch having one end electrically connected to the connection electrode; and
a second line connection line electrically connecting one other end of the second line switch and one of the plurality of second lines, and
the drive element supplies the electrical signal to the one of the second lines via the connection electrode, the second line switch, and the second line connection line.

3. The display device according to claim 2, wherein the drive element and at least a portion of the second circuit unit do not overlap when projected onto the first surface.

4. The display device according to claim 2, wherein the first circuit unit further includes:
a display counter potential line provided in the peripheral region and set to a display counter potential; and
a sense potential line provided in the peripheral region and set to a sense potential different from the display counter potential, and
the third line switch includes:
a first potential switch having one end and one other end, the one end being electrically connected to the display counter potential line, the one other end being electrically connected to the third line connection line; and
a second potential switch having one end and one other end, the one end being electrically connected to the sense potential line, the one other end being electrically connected to the third line connection line.

5. The display device according to claim 3, further comprising a first connection member,
the drive element including a first output electrode provided at a surface of the drive element on the first substrate side, the first output electrode outputting the electrical signal,
the first connection member being disposed between the first output electrode and the connection electrode and electrically connecting the first output electrode and the connection electrode.

6. The display device according to claim 4, further comprising a second connection member,
the drive element including a second output electrode provided on a surface of the drive element on the first substrate side, the second output electrode outputting the display counter potential,
the second connection member being disposed between the second output electrode and the display counter potential line and electrically connecting the second output electrode and the display counter potential line.

7. The display device according to claim 4, further comprising a third connection member,
the drive element including a third output electrode provided on a surface of the drive element on the first substrate side, the third output electrode outputting a control signal of the third line switch,
the third connection member being provided between the third output electrode and the first substrate, the control signal being supplied to the third line switch via the third connection member.

8. The display device according to claim 4, including a control connection member disposed between the drive element and the first substrate, the control connection member controlling a distance between the drive element and the first substrate.

9. The display device according to claim 4, wherein the control circuit unit further includes a fourth circuit unit, and
the fourth circuit unit includes:
an line settable to a prescribed potential, and
a fourth circuit switch having one end and one other end, the one end being electrically connected to the line settable to the prescribed potential, the one other end being electrically connected to the drive element.

10. The display device according to claim 4, further comprising a controller electrically connected to the control circuit unit and the drive element,
the controller causing the control circuit unit and the drive element to implement a first operation,
the first operation including, in a display period,
selecting one of the plurality of switch elements, the one of the plurality of switch elements being connected to one of the plurality of first lines and one of the plurality of second lines,
applying an image potential to a pixel electrode of the plurality of pixel electrodes electrically connected to the selected switch element, and
applying the display counter potential to at least one of the plurality of third lines.

11. The display device according to claim 10, wherein the controller further causes the control circuit unit and the drive element to implement a second operation,
the second operation, in a non-display period, a potential of at least one of the plurality of second lines is set to a floating potential.

12. The display device according to claim 11, comprising a sensor sensing, in the second operation, a change of a capacitance formed between at least one of the plurality of fourth lines and at least one of the plurality of third lines.

13. The display device according to claim 1, further comprising:

a color filter layer including a red filter layer, a green filter layer, and a blue filter layer; and a plurality of fifth lines extending in the second direction, the color filter layer including a first boundary portion between the red filter layer and the green filter layer, a second boundary portion between the green filter layer and the blue filter layer, and a third boundary portion between the blue filter layer and the red filter layer, each of the plurality of fifth lines being electrically connected to one of the plurality of third lines, an electrical resistance of each of the plurality of fifth lines being lower than an electrical resistance of each of the plurality of third lines, the plurality of fifth lines overlapping the first boundary portion or the second boundary portion and not overlapping the third boundary portion when projected onto a plane including the first direction and the second direction.

14. The display device according to claim 13, wherein the third boundary portion and at least one of gaps between the plurality of third lines overlap when projected onto the plane including the first direction and the second direction.

15. The display device according to claim 1, further comprising a color filter layer including a red filter layer, a green filter layer, and a blue filter layer, the color filter layer including a first boundary portion between the red filter layer and the green filter layer, a second boundary portion between the green filter layer and the blue filter layer, and a third boundary portion between the blue filter layer and the red filter layer, the third boundary portion and at least one of gaps between the plurality of third lines overlapping when projected onto a plane including the first direction and the second direction.

* * * * *